(12) United States Patent
Ogata

(10) Patent No.: US 9,854,471 B2
(45) Date of Patent: Dec. 26, 2017

(54) WIRELESS COMMUNICATION APPARATUS, WIRELESS COMMUNICATION SYSTEM, AND WIRELESS COMMUNICATION METHOD

(71) Applicant: NEC Corporation, Tokyo (JP)

(72) Inventor: Hideki Ogata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/786,950

(22) PCT Filed: Apr. 16, 2014

(86) PCT No.: PCT/JP2014/002147
§ 371 (c)(1),
(2) Date: Oct. 23, 2015

(87) PCT Pub. No.: WO2014/174801
PCT Pub. Date: Oct. 30, 2014

(65) Prior Publication Data
US 2016/0073295 A1 Mar. 10, 2016

(30) Foreign Application Priority Data
Apr. 24, 2013 (JP) .................................. 2013-091273

(51) Int. Cl.
*H04W 72/00* (2009.01)
*H04W 28/08* (2009.01)
(Continued)

(52) U.S. Cl.
CPC ............ *H04W 28/08* (2013.01); *H04L 25/14* (2013.01); *H04W 28/06* (2013.01); *H04L 47/365* (2013.01)

(58) Field of Classification Search
CPC ........................... H04L 25/0204; H04W 88/12
(Continued)

(56) References Cited

U.S. PATENT DOCUMENTS

2002/0102987 A1* 8/2002 Souisse .................. H04L 25/14
455/454
2005/0190697 A1 9/2005 Dohi et al.
(Continued)

FOREIGN PATENT DOCUMENTS

EP 2 384 073 A1 11/2011
JP 2010-11179 1/2010
(Continued)

OTHER PUBLICATIONS

N. Taniguchi et al., "A Study of Packet Distribution Method for Packet Order Maintenance in Cognitive Radio Network", IEICE Technical Report, vol. 106, No. 44, pp. 55-60, May 2006.
(Continued)

*Primary Examiner* — Kiet Doan
(74) *Attorney, Agent, or Firm* — Finnegan, Henderson, Farabow, Garrett & Dunner, L.L.P.

(57) ABSTRACT

A wireless communication apparatus, a wireless communication system and a wireless communication method that can suppress the occurrence of differences in transmission delays in a plurality of wireless lines are provided. The wireless communication apparatus (1) includes a division means (12) and a transmission means (14). The transmission means (14) transmits radio waves through a plurality of wireless lines. The division means (12) divides data into data pieces having sizes each of which correspond to the transmission capacity of a respective one of the plurality of the wireless lines and generates a plurality of fragments. Further, the transmission means (14) transmits each of the plurality of the fragments to another wireless communication apparatus through the wireless line having the transmission capacity corresponding to the size of the fragment.

8 Claims, 15 Drawing Sheets

(51) Int. Cl.
*H04W 28/06* (2009.01)
*H04L 25/14* (2006.01)
*H04L 12/805* (2013.01)

(58) Field of Classification Search
USPC ....... 370/444, 329, 343, 335, 338, 431, 252,
370/316, 392, 474, 356, 389; 455/454,
455/414.4, 453
See application file for complete search history.

(56) References Cited

U.S. PATENT DOCUMENTS

2007/0286149 A1* 12/2007 Yamamoto ........ H04W 72/1263
370/345
2008/0125163 A1 5/2008 Chi et al.
2013/0315055 A1 11/2013 Nakano et al.

FOREIGN PATENT DOCUMENTS

JP 2012-191636 10/2012
WO WO 2012/105054 A1 8/2012

OTHER PUBLICATIONS

International Search Report dated Jul. 22, 2014 in corresponding PCT International Application.
Extended European Search Report dated Oct. 26, 2016, by the European Patent Office in counterpart European Patent Application No. 14787534.8.

* cited by examiner

MODULATION SCHEME CORRESPONDENCE TABLE

| | | |
|---|---|---|
| WIRELESS LINE #1 | MODULATION SCHEME A | TRANSMISSION CAPACITY #1A |
| | MODULATION SCHEME B | TRANSMISSION CAPACITY #1B |
| | MODULATION SCHEME C | TRANSMISSION CAPACITY #1C |
| WIRELESS LINE #2 | MODULATION SCHEME A | TRANSMISSION CAPACITY #2A |
| | MODULATION SCHEME B | TRANSMISSION CAPACITY #2B |
| | MODULATION SCHEME C | TRANSMISSION CAPACITY #2C |
| WIRELESS LINE #3 | MODULATION SCHEME A | TRANSMISSION CAPACITY #3A |
| | MODULATION SCHEME B | TRANSMISSION CAPACITY #3B |
| | MODULATION SCHEME C | TRANSMISSION CAPACITY #3C |

Fig. 4

WIRELESS COMMUNICATION APPARATUS, WIRELESS COMMUNICATION SYSTEM, AND WIRELESS COMMUNICATION METHOD

CROSS-REFERENCE TO RELATED PATENT APPLICATIONS

This application is a National Stage Entry of International Application No. PCT/JP2014/002147, filed Apr. 16, 2014, which claims priority from Japanese Patent Application No. 2013-091273, filed Apr. 24, 2013. The entire contents of the above-referenced applications are expressly incorporated herein by reference.

TECHNICAL FIELD

The present invention relates to a wireless communication apparatus, a wireless communication system and a wireless communication method, and in particular, to a wireless communication apparatus, a wireless communication system and a wireless communication method being available for transmission of data through a plurality of wireless lines.

BACKGROUND ART

In a packet transmission network, a network with a wireless line has a small transmittable capacity through only one wireless line. Therefore, a plurality of wireless lines may be bundled into a virtual one line to secure transmission capacity. In other words, the transmittable capacity is secured for the all wireless links by distributing a single traffic into a plurality of wireless lines. This bundling of a plurality of wireless lines is referred to as link aggregation. This link aggregation is specified in IEEE802.3ad.

With reference to the above-mentioned technique, for example, Patent Literature 1 discloses that it is possible to obtain a data rate faster than the data rate which can be realized using a single carrier, by using three carriers whose frequencies are different from each other to perform modulation for and transmit three data streams. Note that when the single data stream is divided into multiple data streams, fragments are formed.

CITATION LIST

Patent Literature

Patent Literature 1: Japanese Unexamined Patent Application Publication No. 2012-191636

SUMMARY OF INVENTION

Technical Problem

In the above Patent Literature, the size of the fragment is not set in consideration of the size of the transmission capacity of a plurality of wireless lines. Therefore, there is a possibility that differences in transmission delays in the wireless lines may become large when data is transmitted through a plurality of wireless lines.

The present invention is carried out for solving the above problem and an object of the present invention is to provide a wireless communication apparatus, a wireless communication system and a wireless communication method that can suppress the occurrence of differences in transmission delays in a plurality of wireless lines.

Solution to Problem

A wireless transmission apparatus according to the present invention includes: transmission means for transmitting radio waves through a plurality of wireless lines; and division means for dividing data into data pieces having sizes each of which correspond to the transmission capacity of a respective one of the plurality of the wireless lines and generating a plurality of fragments, in which the transmission means transmits each of the plurality of the fragments to other wireless communication apparatus through the wireless line having the transmission capacity corresponding to the size of the fragment.

A wireless transmission system according to the present invention includes: a first wireless communication apparatus that transmits radio waves through a plurality of wireless lines; and a second wireless communication apparatus that receives the radio waves through the plurality of the wireless lines, in which the first wireless communication apparatus includes: division means for dividing data into data pieces having sizes each of which correspond to the transmission capacity of a respective one of the plurality of the wireless lines and generating a plurality of fragments; and transmission means for transmitting each of the plurality of the fragments to the second wireless communication apparatus through the wireless line having the transmission capacity corresponding to the size of the fragment, and the second wireless communication apparatus includes: reception means for receiving the plurality of the fragments through the plurality of the wireless lines respectively; and reconstruction means for integrating the plurality of the fragments and reconstructing original data.

A wireless transmission method according to the present invention includes: dividing data into data pieces having sizes each of which correspond to the transmission capacity of a respective one of a plurality of wireless lines and generating a plurality of fragments; and transmitting each of the plurality of the fragments to other wireless communication apparatus through the wireless line having the transmission capacity corresponding to the size of the fragment.

Advantageous Effects of Invention

According to the present invention, it is possible to provide a wireless communication apparatus, a wireless communication system and a wireless communication method that can suppress the occurrence of differences in transmission delays in a plurality of wireless lines.

BRIEF DESCRIPTION OF DRAWINGS

FIG. 4 is an example of a modulation scheme correspondence table stored in the control unit according to the first exemplary embodiment;

DESCRIPTION OF EMBODIMENTS (Outline of the Exemplary Embodiments According to the Present Invention)

Figure 1:
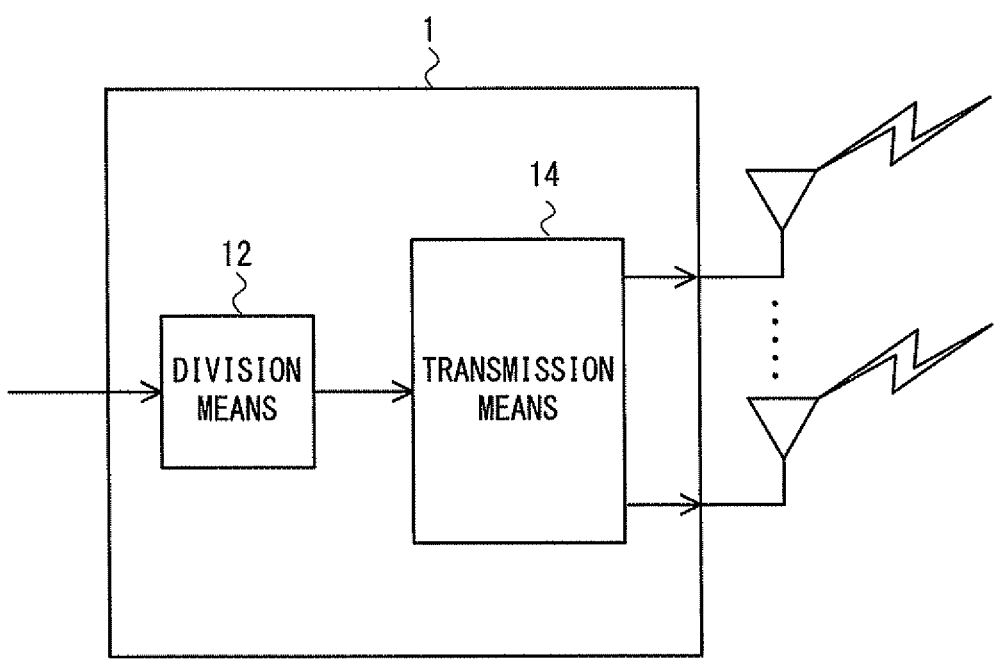
FIG. 1 is a diagram showing an outline of a wireless communication apparatus according to the exemplary embodiments of the present invention.

Prior to explanations of exemplary embodiments, an outline of an exemplary embodiment is explained with reference to FIG. 1. FIG. 1 is a diagram showing an outline of a wireless communication apparatus 1 according to the exemplary embodiments of the present invention. As shown in FIG. 1, the wireless communication apparatus 1 includes a division means 12 and a transmission means 14.

The transmission means 14 transmits radio waves through a plurality of wireless lines. The division means 12 divides data into data pieces having sizes each of which correspond to the transmission capacity of a respective one of the plurality of respective wireless lines and generates a plurality of fragments. Further, the transmission means 14 transmits each of the plurality of the fragments to another wireless communication apparatus through the wireless line having the transmission capacity corresponding to the size of the fragment.

According to the wireless communication apparatus 1 according to the exemplary embodiments of the present invention, it is possible to suppress the occurrence of differences in transmission delays in a plurality of wireless lines.

(First Exemplary Embodiment)

Hereinafter, a first exemplary embodiment is explained with reference to the drawings.

Figure 2:
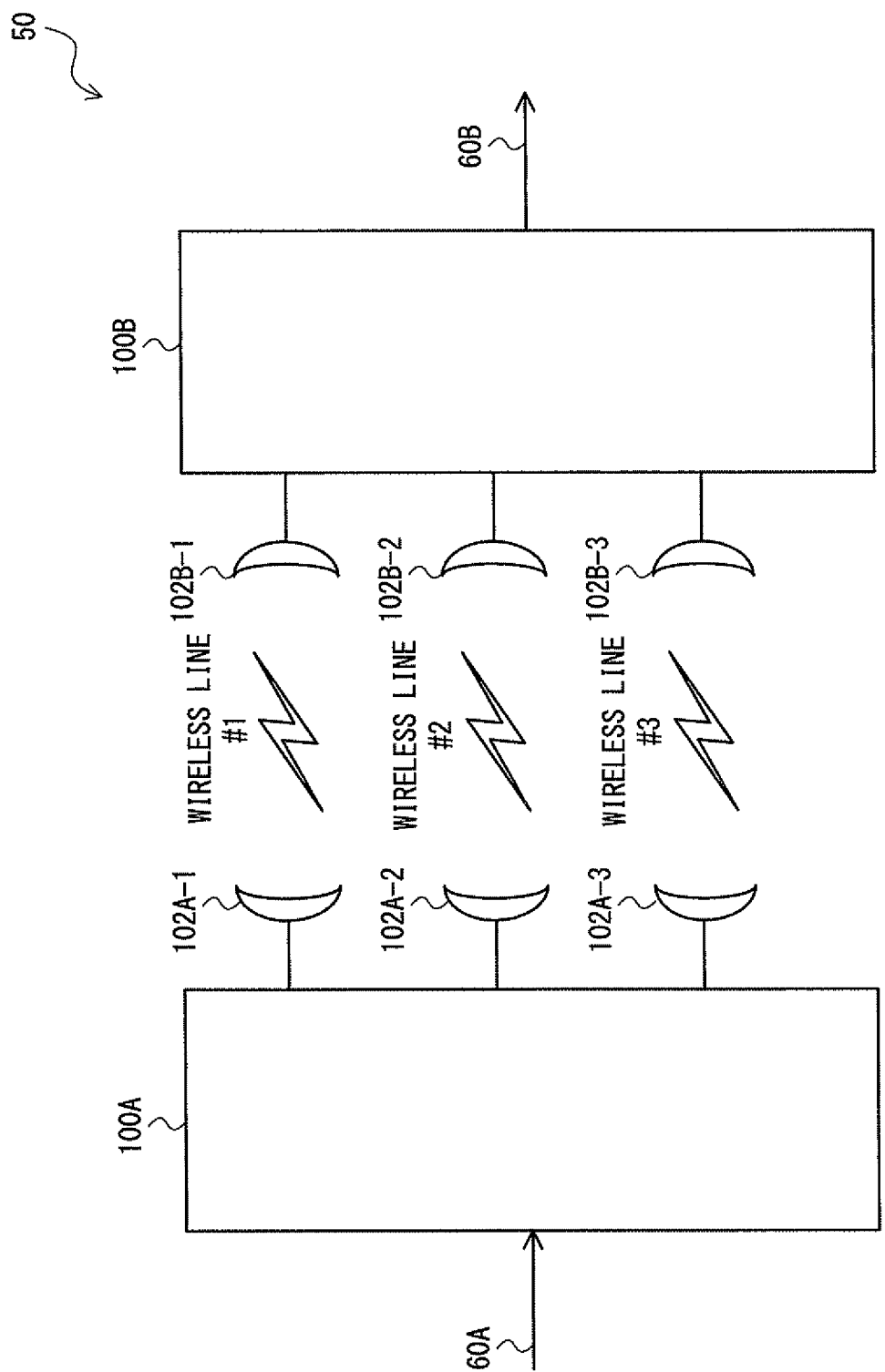
FIG. 2 shows a wireless communication system according to the first exemplary embodiment.

FIG. 2 shows a wireless communication system 50 according to the first exemplary embodiment. The wireless communication system 50 includes a wireless communication apparatus A 100A (first wireless communication apparatus) and a wireless communication apparatus B 100B (second wireless communication apparatus). The wireless communication apparatus A 100A is connected to the wireless communication apparatus B 100B through three wireless lines #1 to #3 (first wireless line, second wireless line) so that they can communicate with each other wirelessly.

Further, the wireless communication apparatus A 100A and the wireless communication apparatus B 100B are connected to a data line 60A and a data line 60B, respectively. The data lines 60A and 60B are lines which are connected to networks of telecommunications carriers, providers and the like. The wireless communication apparatus A 100A and the wireless communication apparatus B 100B transmit and receive user data such as packets or frames through the data lines 60A and 60B. Note that, for example, the wireless communication system 50 may comply with Ethernet (registered trademark).

The wireless communication apparatus A 100A includes three antennas 102A-1 to 102A-3. The antenna 102A-1 transmits and receives radio waves through the wireless line #1. The antenna 102A-2 transmits and receives radio waves through the wireless line #2. The antenna 102A-3 transmits and receives radio waves through the wireless line #3.

Similarly, the wireless communication apparatus B 100B includes three antennas 102B-1 to 102B-3. The antenna 102B-1 transmits and receives radio waves through the wireless line #1. The antenna 102B-2 transmits and receives radio waves through the wireless line #2. The antenna 102B-3 transmits and receives radio waves through the wireless line #3.

Note that the wireless communication apparatus A 100A and the wireless communication apparatus B 100B perform wireless communications by bonding three wireless lines #1 to #3 for one traffic. In other words, note that the wireless communication apparatus A 100A and the wireless communication apparatus B 100B perform the link aggregation for three wireless lines #1 to #3. In this way, the wireless communication apparatus A 100A and the wireless communication apparatus B 100B secure the transmission capacity by bonding a plurality of the wireless lines. That is, even if the transmission capacity of one wireless line is small, a plurality of the wireless lines are bundled by the link aggregation and thereby it is possible to secure the transmission capacity corresponding to the sum of the transmission capacities of the wireless lines.

Further, the wireless communication apparatus A 100A receives the packet (user data) through the data line and divides the packet into a plurality of the fragments. In this case, the wireless communication apparatus A 100A generates a plurality of the fragments (first fragment, second fragment) by dividing data into sizes corresponding to the transmission capacity of each of the wireless lines #1 to #3. The wireless communication apparatus A 100A then transmits, to the wireless communication apparatus B 100B, the generated multiple fragments through the wireless lines #1 to #3 having the transmission capacity corresponding to the sizes of the fragments, respectively. Further, when the wireless communication apparatus B 100B receives the multiple fragments through the wireless lines #1 to #3, the wireless communication apparatus B 100B integrates the multiple fragments and thereby generates (reconstructs) the original packet. Details of this are described later.

Note that the following explanation is based on the assumption that data is transmitted from the wireless communication apparatus A 100A to the wireless communication apparatus B 100B. However, data may be transmitted from the wireless communication apparatus B 100B to the wireless communication apparatus A 100A. Further, the wireless communication apparatus A 100A and the wireless communication apparatus B 100B may include the same components. The following explanation is based on the assumption that the wireless communication apparatus A 100A and the wireless communication apparatus B 100B do include the same components.

Note that, hereinafter, the wireless communication apparatus A 100A and the wireless communication apparatus B 100B are collectively referred to as the wireless communication apparatus 100. Further, hereinafter, when a plurality of components are explained without distinction such as the antennas 102A-1 to 102A-3, the components may be collectively referred to as, for example, the antenna 102A. Further, when no distinction is made between components in the wireless communication apparatus A 100A and components in the wireless communication apparatus B 100B, the components may be collectively referred to as, for example, the antennas 102-1 to 102-3. Moreover, when a plurality of components are explained without any distinction between them being made, the components may be collectively referred to as, for example, the antenna 102.

Figure 3:
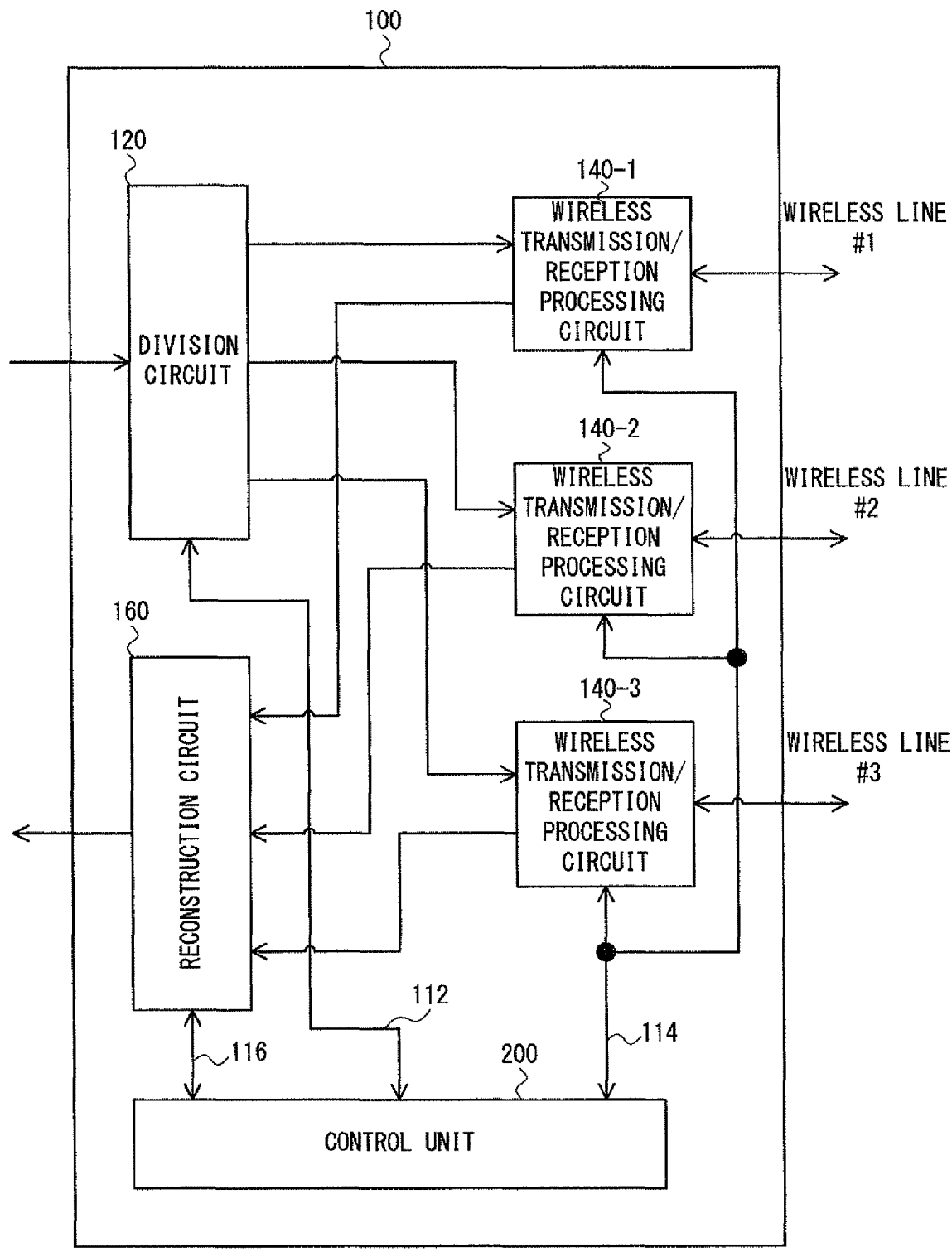
FIG. 3 shows a configuration of the wireless communication apparatus according to the first exemplary embodiment.

FIG. 3 shows a configuration of the wireless communication apparatus 100. The wireless communication apparatus 100 includes a division circuit 120 (division means), wireless transmission/reception processing circuits 140-1 to 140-3 (transmission means, reception means), a reconstruction circuit 160 (reconstruction means) and a control unit 200.

The wireless transmission/reception processing circuits 140-1 to 140-3 correspond to the wireless lines #1 to #3, respectively. That is, the wireless transmission/reception processing circuit 140-1 is connected to the antenna 102-1. Further, the wireless transmission/reception processing circuit 140-2 is connected to the antenna 102-2. Further, the wireless transmission/reception processing circuit 140-3 is connected to the antenna 102-3.

The division circuit 120 is electrically connected to each of the wireless transmission/reception processing circuits 140-1 to 140-3. Further, the division circuit 120 is electrically connected to the data line 60. The reconstruction circuit 160 is electrically connected to each of the wireless transmission/reception processing circuits 140-1 to 140-3. Further, the reconstruction circuit 160 is electrically connected to the data line 60. Note that, although the division circuit 120 and the reconstruction circuit 160 are explained as separate circuits in the following exemplary embodiment, the division circuit 120 and the reconstruction circuit 160 may not be separated. That is, the division circuit 120 and the reconstruction circuit 160 may be configured as the same circuit configuration. In other words, the functions of the division circuit 120 and the reconstruction circuit 160 may be implemented in one circuit.

The division circuit 120 receives a packet through the data line 60, divides the packet and generates the fragments. In this case, the division circuit 120 generates the plurality of the fragments by dividing data into data pieces having sizes each of which corresponds to the transmission capacity of a respective one of the plurality of the wireless lines #1 to #3. Further, the division circuit 120 transmits the fragments whose size corresponds to the transmission capacity of each of the plurality of the wireless lines #1 to #3 to the wireless transmission/reception processing circuits 140-1 to 140-3 corresponding to the wireless lines #1 to #3, respectively. Details of this are described later.

The reconstruction circuit 160 receives, from the wireless transmission/reception processing circuits 140-1 to 140-3, the plurality of the fragments which are transmitted through the wireless lines #1 to #3 corresponding to the wireless transmission/reception processing circuits 140-1 to 140-3, respectively. Further, the reconstruction circuit 160 integrates the multiple fragments, generates the original packet and transmits the packet to the data line 60. Details of this are described later.

The wireless transmission/reception processing circuits 140-1 to 140-3 have a function as a modem. Specifically, the wireless transmission/reception processing circuit 140-1 transmits and receives radio waves through the antenna 102-1 and the wireless line #1, and performs modulation/demodulation processing, amplification processing and the like. The wireless transmission/reception processing circuit 140-2 transmits and receives radio waves through the antenna 102-2 and the wireless line #2, and performs modulation/demodulation processing, amplification processing and the like. The wireless transmission/reception processing circuit 140-3 transmits and receives radio waves through the antenna 102-3 and the wireless line #3, and performs modulation/demodulation processing, amplification processing and the like.

Further, the wireless transmission/reception processing circuit 140-1 monitors radio wave conditions in the wireless line #1. The wireless transmission/reception processing circuit 140-1 performs adaptive modulation processing depending on the radio wave conditions and modifies the modulation scheme appropriately. For example, it is assumed that the wireless transmission/reception processing circuit 140-1 is capable of the AMR (Adaptive Modulation Radio) control. In this case, when the wireless line condition changes, i.e., the quality of the wireless line deteriorates or the like, due to the weather variation or the like, the wireless transmission/reception processing circuit 140-1 modifies the modulation scheme depending on the change and changes the wireless band. For example, when the 16 QAM, 64 QAM, 256 QAM and the like are used as the modulation schemes (multi-value modulation schemes), one modulation scheme may be selected from among these modulation schemes depending on the wireless line condition and the selected modulation scheme may be used.

Note that the wireless transmission/reception processing circuits 140-2 and 140-3 also perform the above-mentioned adaptive modulation processing for the wireless lines #2 and #3, respectively, as the wireless transmission/reception processing circuit 140-1. Further, the above-mentioned AMR control may be performed between the wireless transmission/reception processing circuit 140 of the wireless communication apparatus A 100A which is a transmission side and the wireless transmission/reception processing circuit 140 of the wireless communication apparatus B 100B which is a reception side.

Further, the wireless transmission/reception processing circuits 140-1 to 140-3 transmit the information indicating the current modulation scheme (modulation scheme information) to the control unit 200. The wireless transmission/reception processing circuit 140 may transmit the modulation scheme information to the control unit 200 each time the modulation scheme is modified. Alternatively, the wireless transmission/reception processing circuit 140 may transmit the modulation scheme information to the control unit 200 when there is a request from the control unit 200. Details of this are described later.

The control unit 200 may be configured as a computer including a CPU (Central Processing Unit), a memory and the like. The function of the control unit 200 may be implemented by executing software (program). The control unit 200 controls the division circuit 120 by transmitting information to/receiving it from the division circuit 120 through a division-circuit control bus 112. The control unit 200 controls the wireless transmission/reception processing circuits 140-1 to 140-3 by transmitting information to/receiving it from each of the wireless transmission/reception processing circuits 140-1 to 140-3 through a modem control bus 114. Moreover, the control unit 200 controls the reconstruction circuit 160 by transmitting information to/receiving it from the reconstruction circuit 160 through a reconstruction-circuit control bus 116.

For example, the control unit 200 receives an alarm from the reconstruction circuit 160 when the reconstruction circuit 160 cannot reconstruct the original packet due to some sort of failure. When the control unit 200 receives the alarm, the control unit 200 requests the packet from the wireless communication apparatus A 100A which is the transmission side again, or performs necessary processing such as notifying a user depending on the alarm.

Further, the control unit 200 stores a modulation scheme correspondence table shown in FIG. 4 as an example. As shown in FIG. 4 as an example, each of the wireless lines #1 to #3 is previously associated with information as to how much transmission capacity it has by using which modulation scheme. Note that the transmission capacity of the wireless line is, for example, a bandwidth of the wireless line, and means the amount of data which can be transmitted per unit time through that wireless line (Mbps (bit per second)).

When the modulation scheme is modulation scheme A for the wireless line #1, the transmission capacity of the wireless line #1 is transmission capacity #1A. When the modulation scheme is modulation scheme B for the wireless line #1, the transmission capacity of the wireless line #1 is transmission capacity #1B. When the modulation scheme is modulation scheme C for the wireless line #1, the transmission capacity of the wireless line #1 is transmission capacity #1C. Note that the transmission capacity #1A and the like indicate a specific value of the transmission capacity (e.g. 100 Mbps).

In a similar way, when the modulation scheme is modulation scheme A for the wireless line #2, the transmission capacity of the wireless line #2 is transmission capacity #2A. When the modulation scheme is modulation scheme B for the wireless line #2, the transmission capacity of the wireless line #2 is transmission capacity #2B. When the modulation scheme is modulation scheme C for the wireless line #2, the transmission capacity of the wireless line #2 is transmission capacity #2C.

In a similar way, when the modulation scheme is modulation scheme A for the wireless line #3, the transmission capacity of the wireless line #3 is transmission capacity #3A. When the modulation scheme is modulation scheme B for the wireless line #3, the transmission capacity of the wireless line #3 is transmission capacity #3B. When the modulation scheme is modulation scheme C for the wireless line #3, the transmission capacity of the wireless line #3 is transmission capacity #3C.

The control unit 200 refers to the modulation scheme correspondence table and uses the modulation scheme information from the wireless transmission/reception processing circuit 140 to obtain the transmission capacity of each of the wireless lines #1 to #3. Note that the contents of the modulation scheme correspondence table can be changed as appropriate. Details of the processing are described later.

In the example shown in FIG. 4, the modulation schemes which can be adapted for the wireless lines #1 to #3 are the modulation schemes A to C. That is, same three types of modulation schemes can be adapted for each of the wireless lines #1 to #3. However, the modulation schemes which can be adapted for the wireless lines #1 to #3 may differ depending on the wireless line. For example, the modulation schemes which can be adapted for the wireless line #1 may be the modulation schemes A and B and the modulation schemes which can be adapted for the wireless line #2 may be the modulation schemes B and C.

Next, the operation in the wireless communication system 50 according to the first exemplary embodiment will be explained.

Figure 5:
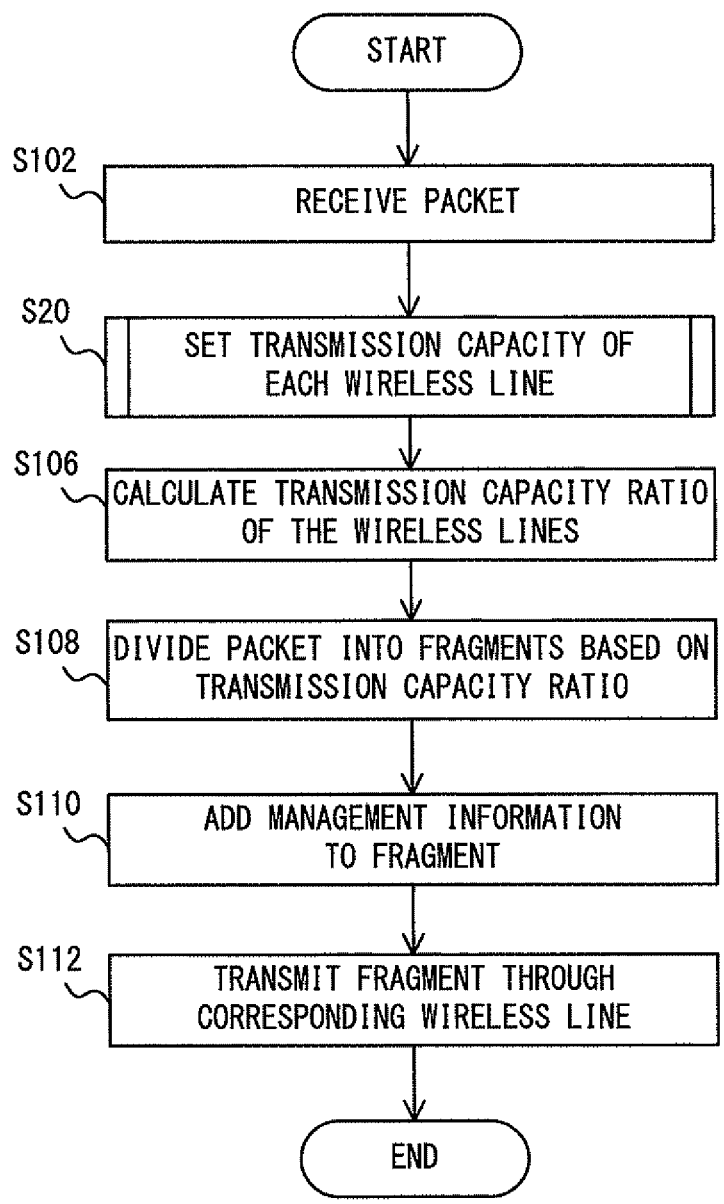
FIG. 5 is a flowchart indicating the operation in the wireless communication apparatus being the transmission side according to the first exemplary embodiment.
Figure 6:
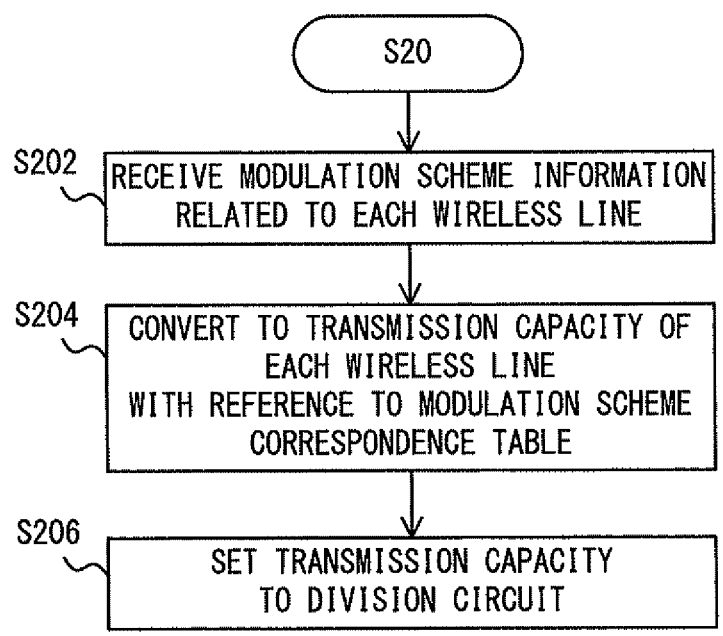
FIG. 6 is a flowchart indicating the operation in the wireless communication apparatus being the transmission side according to the first exemplary embodiment.
Figure 7:
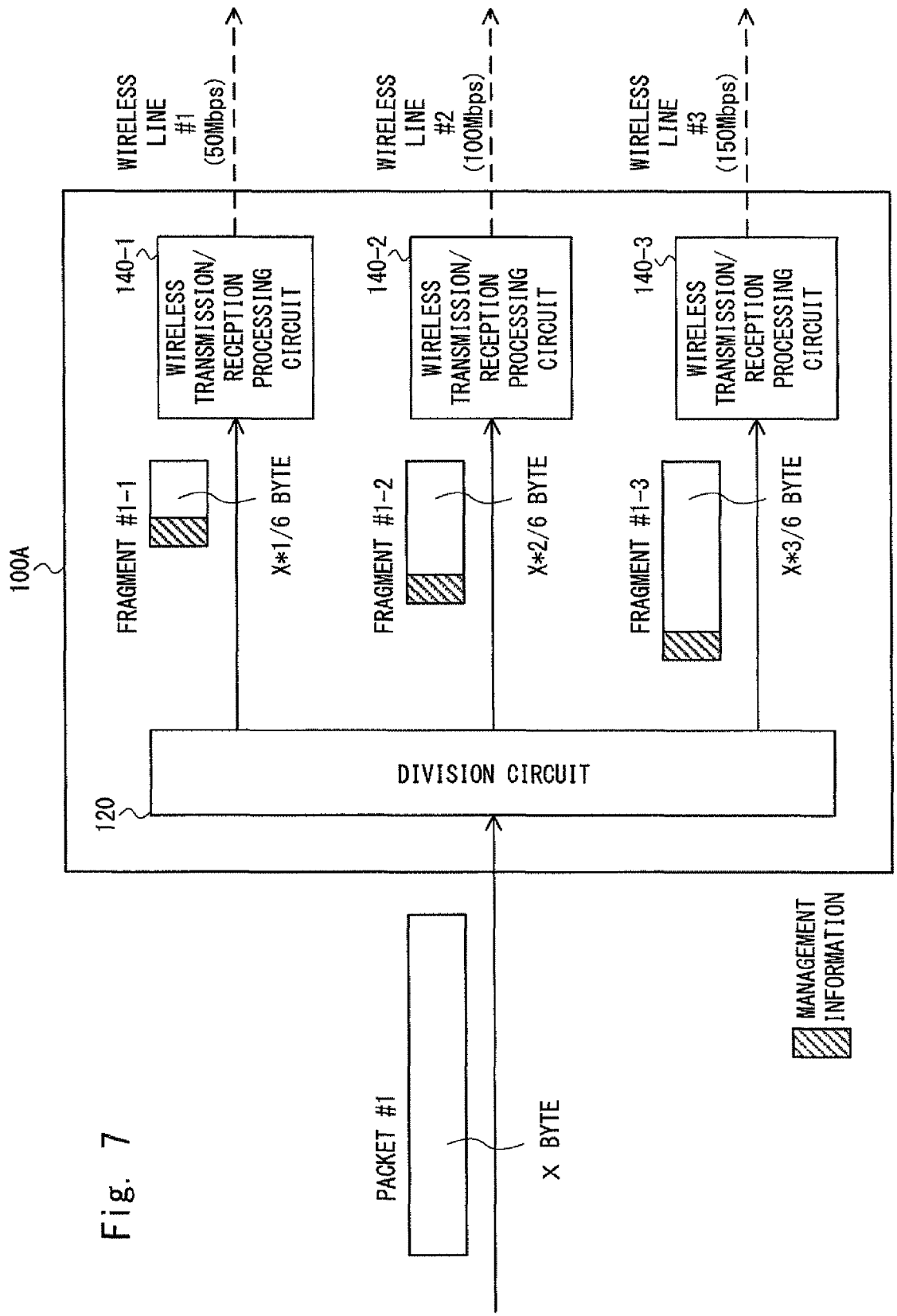
FIG. 7 is an example of flow of data in the wireless communication apparatus being the transmission side according to the first exemplary embodiment.

FIGS. 5 and 6 are flowcharts indicating the operation in the wireless communication apparatus 100 which is the transmission side (the wireless communication apparatus A 100A). FIG. 7 is an example of flow of data (the packet and fragments) in the wireless communication apparatus 100 which is the transmission side (the wireless communication apparatus A 100A).

Figure 8:
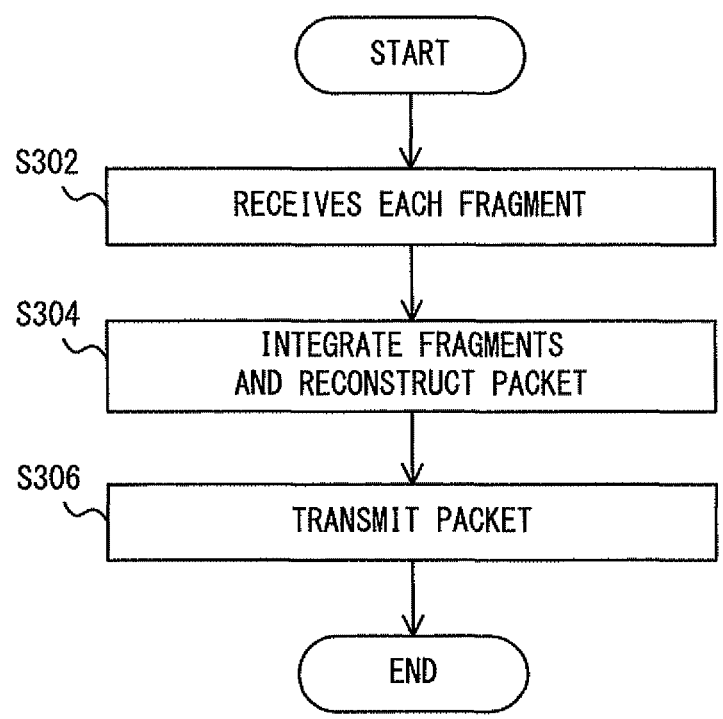
FIG. 8 is a flowchart indicating the operation in the wireless communication apparatus being the reception side according to the first exemplary embodiment.
Figure 9:
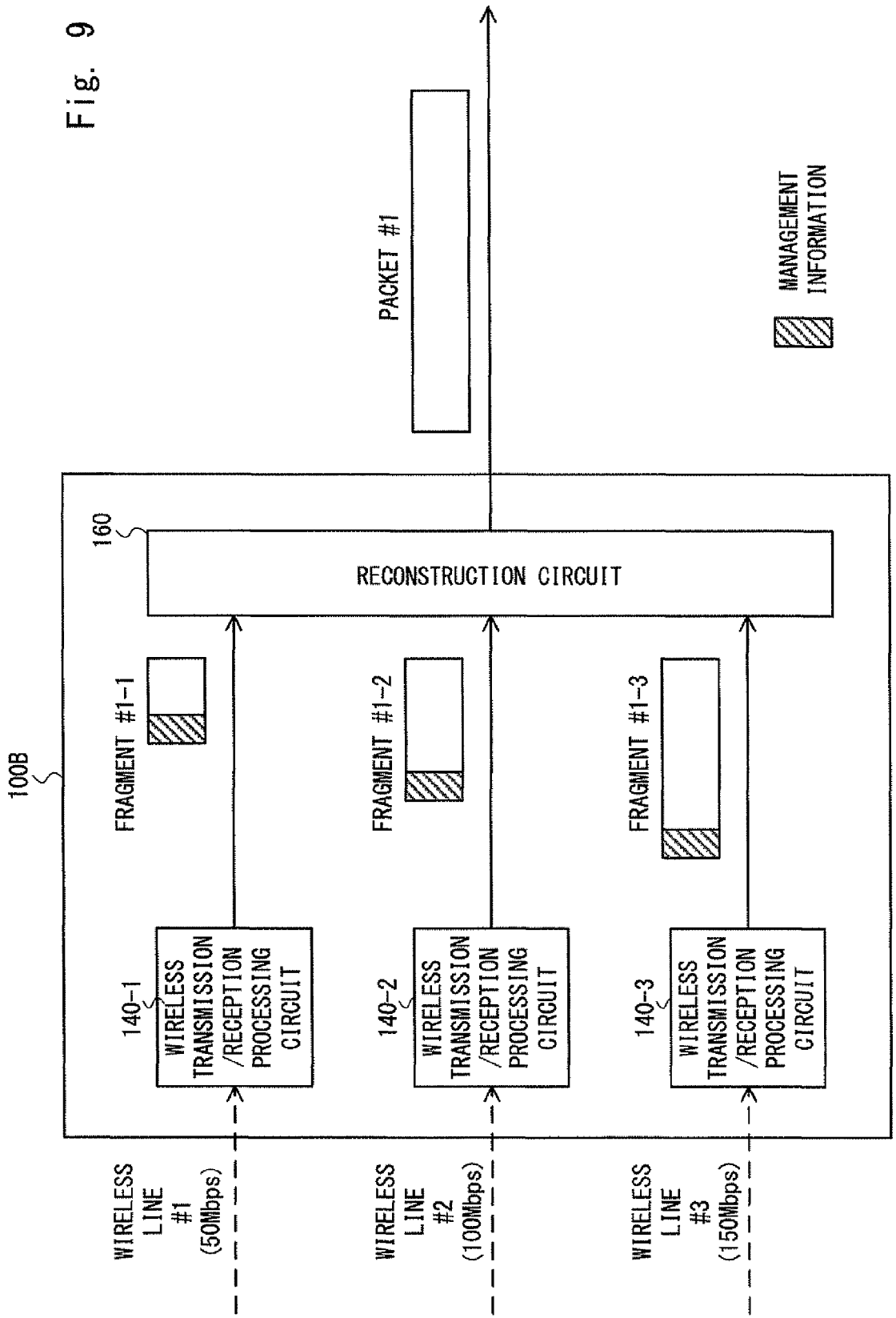
FIG. 9 is an example of flow of data in the wireless communication apparatus being the reception side according to the first exemplary embodiment.

FIG. 8 is a flowchart indicating the operation in the wireless communication apparatus 100 which is the reception side (the wireless communication apparatus B 100B). FIG. 9 is an example of flow of data in the wireless communication apparatus 100 which is the reception side (the wireless communication apparatus B 100B).

Note that at least one component of the wireless communication apparatus 100 is omitted as appropriate in FIGS. 7 and 9.

Firstly, the processing of the wireless communication apparatus 100 which is the transmission side (the wireless communication apparatus A 100A) is explained using FIGS. 5 to 7. The wireless communication apparatus A 100A receives the packet through the data line 60 (S102). Specifically, the division circuit 120 receives a packet #1 as shown in FIG. 7.

Next, the control unit 200 of the wireless communication apparatus A 100A sets the transmission capacity of each of the wireless lines (S20). The specific processing of S20 is shown in FIG. 6. Firstly, the control unit 200 receives the modulation scheme information related to each of the wireless lines from the wireless transmission/reception processing circuits 140-1 to 140-3 (S202).

Next, the control unit 200 refers to the modulation scheme correspondence table shown in FIG. 4 as an example and converts the modulation scheme information related to each of the wireless lines #1 to #3 to the transmission capacity (S204). For example, when the modulation scheme information from the wireless transmission/reception processing circuit 140-1 indicates the modulation scheme A (e.g. "16 QAM"), the control unit 200 refers to the modulation scheme correspondence table and converts the modulation scheme information related to the wireless line #1 to the transmission capacity #1A (50 Mbps in the example shown in FIG. 7).

For example, when the modulation scheme information from the wireless transmission/reception processing circuit 140-2 indicates the modulation scheme B (e.g. "64 QAM"), the control unit 200 refers to the modulation scheme correspondence table and converts the modulation scheme information related to the wireless line #2 to the transmission capacity #2B (100 Mbps in the example shown in FIG. 7). Moreover, for example, when the modulation scheme information from the wireless transmission/reception processing circuit 140-3 indicates the modulation scheme C (e.g. "256 QAM"), the control unit 200 refers to the modulation scheme correspondence table and converts the modulation scheme information related to the wireless line #3 to the transmission capacity #3C (150 Mbps in the example shown in FIG. 7).

Next, the control unit 200 sets the transmission capacities of the wireless lines #1 to #3 to the division circuit 120 (S206). Specifically, the control unit 200 transmits, to the control unit 200, information (transmission capacity information) indicating the transmission capacities #1 to #3 of the wireless lines #1 to #3 respectively. Therefore, the transmission capacities #1 to #3 are set to the control unit 200.

FIG. 5 is again referred to for the explanation. Next, the division circuit 120 of the wireless communication apparatus A 100A calculates the ratio among the transmission capacities of the wireless lines #1 to #3 (S106). Specifically, the division circuit 120 calculates a ratio "(transmission capacity #1):(transmission capacity #2):(transmission capacity #3)" as the ratio among the transmission capacities based on the transmission capacities #1 to #3 of the respective wireless lines #1 to #3 which are received from the control unit 200.

Moreover, the division circuit 120 calculates a ratio "(transmission capacity #1)/((transmission capacity #1)+(transmission capacity #2)+(transmission capacity #3))" as the ratio (rate) of the transmission capacity of the wireless line #1. In a similar way, the division circuit 120 calculates a ratio "(transmission capacity #2)/((transmission capacity #1)+(transmission capacity #2)+(transmission capacity #3))" as the ratio (rate) of the transmission capacity of the wireless line #2. In a similar way, the division circuit 120 calculates a ratio "(transmission capacity #3)/((transmission capacity #1)+(transmission capacity #2)+(transmission capacity #3))" as the ratio (rate) of the transmission capacity of the wireless line #3.

For example, when the transmission capacity #1 of the wireless line #1 is 50 Mbps, the transmission capacity #2 of the wireless line #2 is 100 Mbps and the transmission capacity #3 of the wireless line #3 is 150 Mbps as shown in FIG. 7 as an example, the division circuit 120 calculates the ratio among the transmission capacities #1 to #3 of the wireless lines #1 to #3 as "50:100:150=1:2:3". Further, in this case, the division circuit 120 calculates the ratio of the transmission capacity of the wireless line #1 as 1/6, the ratio of the transmission capacity of the wireless line #2 as 2/6, and the ratio of the transmission capacity of the wireless line #3 as 3/6.

In this way, the division circuit 120 calculates the ratio among the transmission capacities of the wireless lines and the ratio of the transmission capacity of each of the wireless line.

Next, the division circuit 120 of the wireless communication apparatus A 100A divides the packet into fragments based on the calculated ratio among the transmission capacities (S108). That is, the division circuit 120 divides the packet for the calculated ratio among the transmission capacities to generate the fragments. In other words, the division circuit 120 divides the packet into the fragments whose sizes correspond to the calculated ratio among the transmission capacities.

Specifically, the division circuit 120 divides the packet into fragments so that the ratio among the sizes of the fragments is equal to the ratio "(transmission capacity #1):(transmission capacity #2):(transmission capacity #3)". If the size of a packet #1 is X byte, the division circuit 120 calculates the size of a fragment #1-1 corresponding to the wireless line #1 by an expression "X*(transmission capacity #1)/((transmission capacity #1)+(transmission capacity #2)+(transmission capacity #3)) [byte]". In a similar way, the division circuit 120 calculates the size of a fragment #1-2 corresponding to the wireless line #2 by an expression "X*(transmission capacity #2)/((transmission capacity #1)+(transmission capacity #2)+(transmission capacity #3)) [byte]". In a similar way, the division circuit 120 calculates the size of a fragment #1-3 corresponding to the wireless line #3 by an expression "X*(transmission capacity #3)/((transmission capacity #1)+(transmission capacity #2)+(transmission capacity #3)) [byte]".

Moreover, the division circuit 120 divides the packet into fragments based on the calculated division ratio. In the example shown in FIG. 7, if the size of the packet #1 is X byte, the division circuit 120 divides the packet #1 into the fragment #1-1 whose size is X*1/6 byte, the fragment #1-2 whose size is X*2/6 byte and the fragment #1-3 whose size is X*3/6 byte. That is, the size of the fragment #1-1 corresponds to the amount (ratio) of the transmission capacity of the wireless line #1. The size of the fragment #1-2 corresponds to the amount (ratio) of the transmission capacity of the wireless line #2. The size of the fragment #1-3 corresponds to the amount (ratio) of the transmission capacity of the wireless line #3.

Next, the division circuit 120 of the wireless communication apparatus A 100A adds a management information to each fragment (inserts a management information into each fragment) (S110). The management information is control information such as an overhead (OH). The management information includes an identifier of the original packet for the fragment and order information indicating an order of that fragment in the original packet. As mentioned later, the wireless communication apparatus B 100B can integrate the fragments to reconstruct the original packet by using this management information.

For example, in the example shown in FIG. 7, the fragment #1-1 is the first in order, the fragment #1-2 is the second in order, and the fragment #1-3 is the third in order. Therefore, the division circuit 120 adds the management information including the identifier of the packet #1 and the order information indicating the first in order to the fragment #1-1. In a similar way, the division circuit 120 adds the management information including the identifier of the packet #1 and the order information indicating the second in order to the fragment #1-2. In a similar way, the division circuit 120 adds the management information including the identifier of the packet #1 and the order information indicating the third in order to the fragment #1-3.

Next, the wireless communication apparatus A 100A transmits each fragment through the wireless line having the transmission capacity corresponding to the size of that fragment (S112). Specifically, the division circuit 120 transmits the fragment #1-1 whose size corresponds to the ratio of the transmission capacity #1 of the wireless line #1 to the wireless transmission/reception processing circuit 140-1 corresponding to the wireless line #1. The division circuit 120 transmits the fragment #1-2 whose size corresponds to the ratio of the transmission capacity #2 of the wireless line #2 to the wireless transmission/reception processing circuit 140-2 corresponding to the wireless line #2. The division circuit 120 transmits the fragment #1-3 whose size corresponds to the ratio of the transmission capacity #3 of the wireless line #3 to the wireless transmission/reception processing circuit 140-3 corresponding to the wireless line #3.

The wireless transmission/reception processing circuit 140-1 performs the processing such as the modulation processing and the amplification for the fragment #1-1 and transmits the radio wave to the wireless communication apparatus B 100B being the reception side through the wireless line #1. The wireless transmission/reception processing circuit 140-2 performs the processing such as the modulation processing and the amplification for the fragment #1-2 and transmits the radio wave to the wireless communication apparatus B 100B which is the reception side through the wireless line #2. The wireless transmission/reception processing circuit 140-3 performs the processing such as the modulation processing and the amplification for the fragment #1-3 and transmits the radio wave to the wireless communication apparatus B 100B which is the reception side through the wireless line #3.

Next, the processing of the wireless communication apparatus 100 which is the reception side (the wireless communication apparatus B 100B) is explained using FIGS. 8 and 9.

The wireless communication apparatus B 100B receives each fragment from the wireless communication apparatus A 100A which is the transmission side (S302). Specifically, the wireless transmission/reception processing circuit 140-1 of the wireless communication apparatus B 100B receives the radio wave including the fragment #1-1 through the wireless line #1. The wireless transmission/reception processing circuit 140-1 then performs the demodulation processing, the amplification processing and the like, and transmits the obtained fragment #1-1 to the reconstruction circuit 160.

In a similar way, the wireless transmission/reception processing circuit 140-2 of the wireless communication apparatus B 100B receives the radio wave including the fragment #1-2 through the wireless line #2. The wireless transmission/reception processing circuit 140-2 then performs the demodulation processing, the amplification processing and the like, and transmits the obtained fragment #1-2 to the reconstruction circuit 160. In a similar way, the wireless transmission/reception processing circuit 140-3 of the wireless communication apparatus B 100B receives the radio wave including the fragment #1-3 through the wireless line #3. The wireless transmission/reception processing circuit 140-3 then performs the demodulation processing, the amplification processing and the like, and transmits the obtained fragment #1-3 to the reconstruction circuit 160.

In this case, as shown in FIG. 9 as an example, the transmission capacities of the wireless lines #1 to #3 are different from each other. However, as mentioned above, the wireless communication apparatus A 100A which is the transmission side has divided the packet into the fragments depending on the amount of their transmission capacities. That is, the wireless communication apparatus A 100A which is the transmission side has generated the fragments whose sizes correspond to the transmission capacities of the wireless lines #1 to #3 and has transmitted the fragments through the corresponding wireless lines #1 to #3, respectively. In other words, wireless communication apparatus A 100A has transmitted the larger-size fragment through the wireless line having the larger amount of the transmission capacity and has transmitted the smaller-size fragment through the wireless line having the smaller amount of the transmission capacity.

If the data whose sizes are the same are transmitted through the wireless lines regardless of the transmission capacities of the wireless lines, the data is earlier received through the wireless line whose transmission capacity is larger, and the data is later received through the wireless line whose transmission capacity is smaller. However, in this exemplary embodiment, the fragments are transmitted as mentioned above. Therefore, the differences between the time at which the wireless transmission/reception processing circuit 140-1 receives the fragment #1-1, the time at which the wireless transmission/reception processing circuit 140-2 receives the fragment #1-2, and the time at which the wireless transmission/reception processing circuit 140-3 receives the fragment #1-3 are reduced.

In other words, the wireless transmission/reception processing circuits 140-1 to 140-3 can receive the fragments #1-1 to #1-3 respectively at approximately the same time. In other words, when data are transmitted through the wireless lines #1-#3, it is possible to suppress the occurrence of differences in transmission delays in the wireless lines.

Next, the reconstruction circuit 160 of the wireless communication apparatus B 100B integrates the fragments and thereby reconstructs the original packet (S304). The reconstruction circuit 160 then transmits the reconstructed packet to the data line 60 (60B) (S306).

Specifically, the reconstruction circuit 160 receives the fragments #1-1 to #1-3 from the wireless transmission/reception processing circuits 140-1 to 140-3, respectively. The reconstruction circuit 160 then uses the management information added to the fragments #1-1 to #1-3 to detect the identifier of the original packet for the fragments and the order of the fragments. Therefore, the reconstruction circuit 160 integrates the fragments #1-1 to #1-3 in the order of these fragments in the original packet.

In the above-mentioned example, the management information indicating the first in order is added to the fragment #1-1, the management information indicating the second in order is added to the fragment #1-2, and the management information indicating the third in order is added to the fragment #1-3. Therefore, the reconstruction circuit 160 integrates the fragments #1-1 to #1-3 so that the fragment #1-1 is the first in order, the fragment #1-2 is the second in order and the fragment #1-3 is the third in order. When they are integrated, the reconstruction circuit 160 removes the management information. Therefore, the reconstruction circuit 160 reconstructs the original packet #1.

It is assumed that the timings at which the reconstruction circuit 160 receives the plurality of the fragments are out of alignment. In this case, even if one fragment is received early, other fragments are not received. Therefore, it is necessary to provide a buffer which satisfies the size of the received data, to store the fragment received early in the buffer, to retrieve the fragment stored in the buffer when all of the fragments are received and to integrate them.

On the other hand, in this exemplary embodiment, the wireless transmission/reception processing circuits 140-1 to 140-3 receive the fragments #1-1 to #1-3 respectively at the approximately the same time, as mentioned above. Thus, the reconstruction circuit 160 also receives the fragments #1-1 to #1-3 from the wireless transmission/reception processing circuits 140-1 to 140-3 respectively at the approximately the same time. Therefore, it is possible to reconstruct the packet without providing a large buffer in the wireless communication apparatus B 100B which is the reception side.

In this exemplary embodiment, even if the wireless transmission/reception processing circuit 140 modifies the modulation scheme by the adaptive modulation processing, it is possible to determine the divided size of the fragments in each case. That is, it is assumed that, when the wireless communication apparatus A 100A which is the transmission side transmits the packet #1 and, immediately after that, receives the next packet #2, the modulation scheme of a wireless line is modified by the adaptive modulation processing. Even then, the control unit 200 can obtain the transmission capacity corresponding to the modulation scheme of each of the wireless lines at the step for processing the packet #2 by the processing of S20 in FIG. 5.

Therefore, even if the transmission capacity is changed with the modification of the modulation scheme, the reconstruction circuit 160 can divide the packet #2 into fragments in the size corresponding to the amount of the changed transmission capacity by the processing of the S108 of FIG. 5.

(Second Exemplary Embodiment)

Next, the second exemplary embodiment is explained. In the second exemplary embodiment, the minimum size of the fragment is configured to be set, in addition to the configuration and the operation according to the first exemplary embodiment. For example, the minimum size of the fragment for Ethernet (registered trademark) is defined as 64 bytes. In the second exemplary embodiment, even in this case, it is possible to divide data in the size according to the amount of the transmission capacity of each of the wireless lines to generate the fragments, as mentioned below. In the exemplary embodiment hereinafter, the minimum size is 64 bytes. However, this value is indicated merely as an example and the minimum size may be set as appropriate.

Note that the configurations of the wireless communication system 50 and the wireless communication apparatus 100 according to the second exemplary embodiment are substantially similar to the configurations shown in FIGS. 2 to 4. Thus, the explanation of the configurations may be omitted. Further, the operation of the wireless communication apparatus B 100B which is the reception side is also substantially similar to the processing operation shown in FIG. 8 of the first exemplary embodiment. Thus, the explanation of the operation may be omitted.

Figure 10:
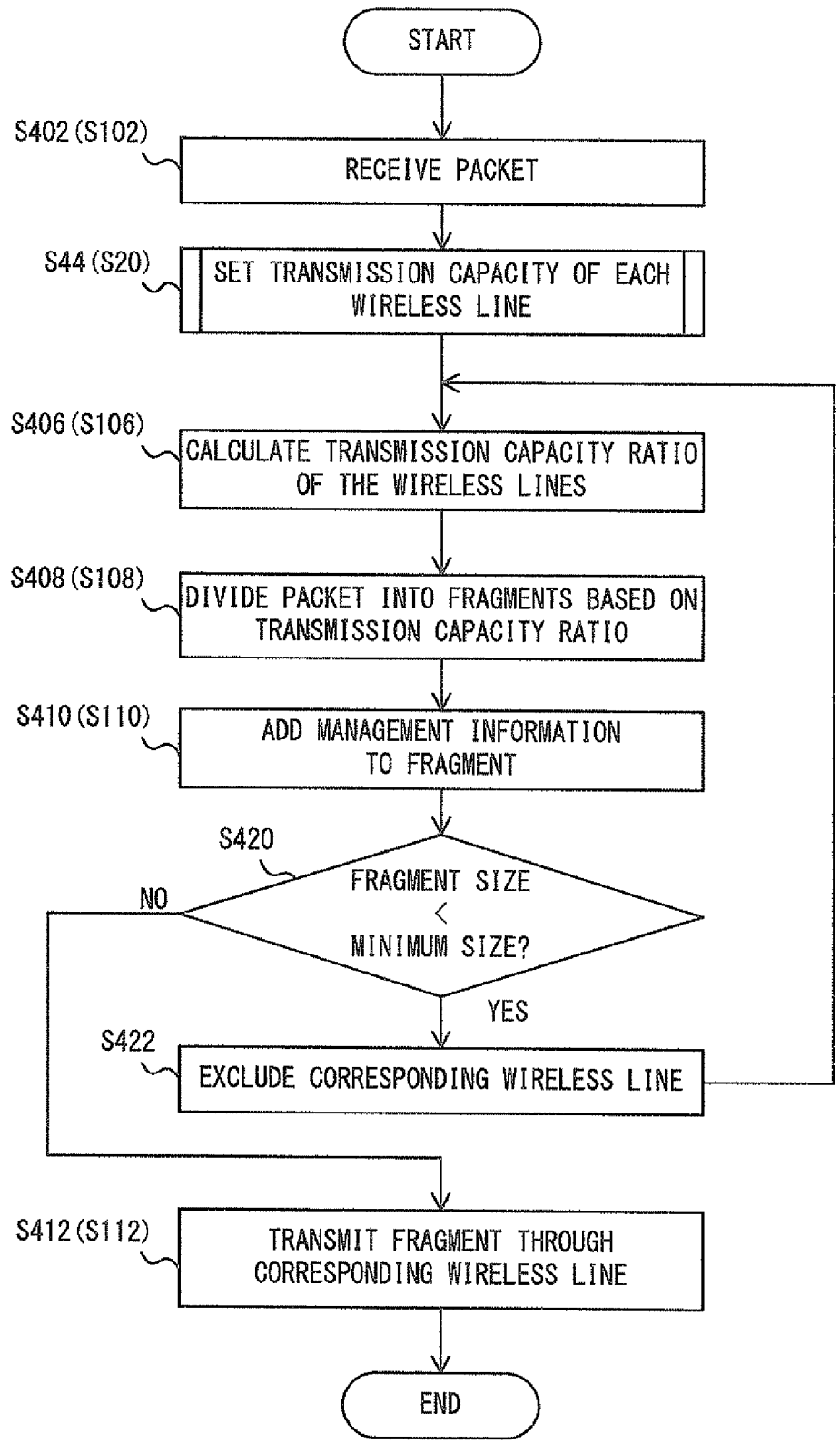
FIG. 10 is a flowchart indicating the operation in the wireless communication apparatus being the transmission side according to the second exemplary embodiment.
Figure 11:
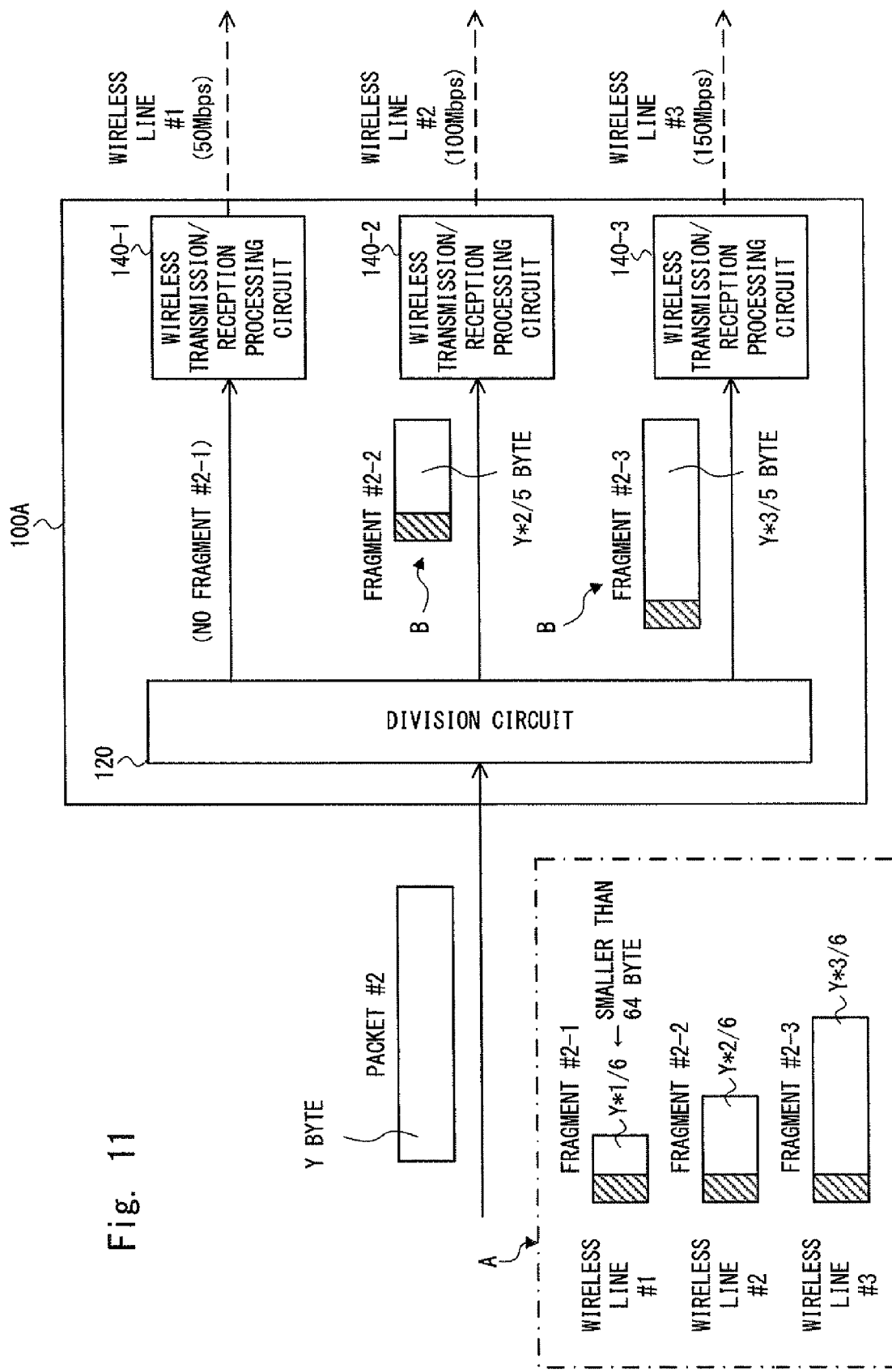
FIG. 11 is an example of flow of data in the wireless communication apparatus being the transmission side according to the second exemplary embodiment.

FIG. 10 is a flowchart indicating the operation in the wireless communication apparatus A 100A which is the transmission side according to the second exemplary embodiment. FIG. 11 is an example of flow of data in the wireless communication apparatus 100 which is the transmission side (the wireless communication apparatus A 100A). Note that at least one component of the wireless communication apparatus 100 is omitted as appropriate in FIG. 11.

The wireless communication apparatus A 100A receives the packet through the data line 60 (S402), as in the case of the processing of S102 in FIG. 5. Specifically, the division circuit 120 receives a packet #2 as shown in FIG. 11. Next, the control unit 200 of the wireless communication apparatus A 100A sets the transmission capacity of each of the wireless lines (S44), as in the case of the processing of S20 in FIG. 5. The processing of S44 is substantially similar to the processing of S20 in FIG. 5. Thus, the explanation of the processing may be omitted.

Next, the division circuit 120 of the wireless communication apparatus A 100A calculates the ratio among the transmission capacities of the wireless lines #1 to #3 (S406), as in the case of the processing of S106 in FIG. 5. Specifically, the division circuit 120 calculates a ratio "(transmission capacity #1):(transmission capacity #2):(transmission capacity #3)" as the ratio among the transmission capacities based on the transmission capacities #1 to #3 of the respective wireless lines #1 to #3 which are received from the control unit 200.

Moreover, the division circuit 120 calculates a ratio "(transmission capacity #1)/((transmission capacity #1)+(transmission capacity #2)+(transmission capacity #3))" as the ratio (rate) of the transmission capacity of the wireless line #1. In a similar way, the division circuit 120 calculates a ratio "(transmission capacity #2)/((transmission capacity #1)+(transmission capacity #2)+(transmission capacity #3))" as the ratio (rate) of the transmission capacity of the wireless line #2. In a similar way, the division circuit 120 calculates a ratio "(transmission capacity #3)/((transmission capacity #1)+(transmission capacity #2)+(transmission capacity #3))" as the ratio (rate) of the transmission capacity of the wireless line #3.

In the example shown in FIG. 11, the transmission capacity #1 of the wireless line #1 is 50 Mbps, the transmission capacity #2 of the wireless line #2 is 100 Mbps and the transmission capacity #3 of the wireless line #3 is 150 Mbps. Therefore, the division circuit 120 calculates the ratio among the transmission capacities #1 to #3 of the wireless lines #1 to #3 as "50:100:150=1:2:3". Further, in this case, the division circuit 120 calculates the ratio of the transmission capacity of the wireless line #1 as 1/6, the ratio of the transmission capacity of the wireless line #2 as 2/6 (1/3) and the ratio of the transmission capacity of the wireless line #3 as 3/6 (1/2).

Next, the division circuit 120 of the wireless communication apparatus A 100A divides the packet into the fragments based on the calculated ratio among the transmission capacities (S408), as in the case of the processing of S108 in FIG. 5. If the size of a packet #2 is Y byte, the division circuit 120 calculates the size of a fragment #2-1 corresponding to the wireless line #1 by an expression "Y*(transmission capacity #1)/((transmission capacity #1)+(transmission capacity #2)+(transmission capacity #3)) [byte]". In a similar way, the division circuit 120 calculates the size of a fragment #2-2 corresponding to the wireless line #2 by an expression "Y*(transmission capacity #2)/((transmission capacity #1)+(transmission capacity #2)+(transmission capacity #3)) [byte]". In a similar way, the division circuit 120 calculates the size of a fragment #2-3 corresponding to the wireless line #3 by an expression "Y*(transmission capacity #3)/((transmission capacity #1)+(transmission capacity #2)+(transmission capacity #3)) [byte]".

Moreover, the division circuit 120 divides the packet into the fragments based on the calculated division ratio. In the example shown in FIG. 11, if the size of the packet #1 is Y byte, the division circuit 120 divides the packet #2 into the fragment #2-1 whose size is Y*1/6 byte, the fragment #2-2 whose size is Y*2/6 byte and the fragment #2-3 whose size is Y*3/6 byte, as shown at the portion surrounded by a dashed-dotted line A in FIG. 11. That is, the size of the fragment #2-1 corresponds to the amount (ratio) of the transmission capacity of the wireless line #1. The size of the fragment #2-2 corresponds to the amount (ratio) of the transmission capacity of the wireless line #2. The size of the fragment #2-3 corresponds to the amount (ratio) of the transmission capacity of the wireless line #3.

Next, the division circuit 120 of the wireless communication apparatus A 100A adds a management information to each fragment (S410), as in the case of the processing of S110 in FIG. 5.

Next, the division circuit 120 of the wireless communication apparatus A 100A determines whether the size of each fragment is smaller than the minimum size or not (S420). For example, if the minimum size is 64 bytes, the division circuit 120 determines whether the size of each of the fragments #2-1 to #2-3 is smaller than 64 bytes or not. When the sizes of all of the fragments #2-1 to #2-3 are equal to or larger than 64 byte (NO at S420), the wireless communication apparatus A 100A transmits each fragment through the wireless line having the transmission capacity corresponding to the size of that fragment (S412) to the wireless communication apparatus B 100B which is the reception side, as in the case of the processing of S112 in FIG. 5.

On the other hand, when the size of at least one of the fragments #2-1 to #2-3 is smaller than 64 bytes (YES at S420), the division circuit 120 excludes the wireless line corresponding to the fragment whose size is smaller than the minimum size from the wireless lines used for the transmission of the fragments (packet) (S422). Then, the operation returns back to the processing of S406.

Specifically, for example, as shown at the portion surrounded by a dashed-dotted line A in FIG. 11, when the size of the fragment #2-1 is smaller than the minimum size, i.e., where Y*1/6<64 [bytes], the division circuit 120 excludes the wireless line #1 corresponding to the fragment #2-1 from the wireless lines used for the transmission of the fragments (packet).

Moreover, the division circuit 120 recalculates the ratio between the transmission capacities of the wireless lines #2 and #3, in which the wireless line #1 is excluded (S406).

Specifically, the division circuit 120 calculates a ratio "(transmission capacity #2):(transmission capacity #3)" as the ratio between the transmission capacities based on the transmission capacities #2 and #3 of the respective wireless lines #2 and #3. Moreover, the division circuit 120 calculates a ratio "(transmission capacity #2)/((transmission capacity #2)+(transmission capacity #3))" as the ratio of the transmission capacity of the wireless line #2. In a similar way, the division circuit 120 calculates a ratio "(transmission capacity #3)/((transmission capacity #2)+(transmission capacity #3))" as the ratio of the transmission capacity of the wireless line #3.

In the example shown in FIG. 11, the transmission capacity #2 of the wireless line #2 is 100 Mbps and the transmission capacity #3 of the wireless line #3 is 150 Mbps. Therefore, the division circuit 120 calculates the ratio between the transmission capacities #2 and #3 of the wireless lines #2 and #3 as "100:150=2:3". Further, in this case, the division circuit 120 calculates the ratio of the transmission capacity of the wireless line #2 as 2/5 and the ratio of the transmission capacity of the wireless line #3 as 3/5.

Next, the division circuit 120 of the wireless communication apparatus A 100A re-divides the packet into the fragments based on the recalculated ratio among the transmission capacities (S408). The division circuit 120 calculates the size of a fragment #2-2 corresponding to the wireless line #2 by an expression "Y*(transmission capacity #2)/((transmission capacity #2)+(transmission capacity #3)) [byte]". In a similar way, the division circuit 120 calculates the size of a fragment #2-3 corresponding to the wireless line #3 by an expression "Y*(transmission capacity #3)/((transmission capacity #2)+(transmission capacity #3)) [byte]".

Moreover, the division circuit 120 re-divides the packet into the fragments based on the recalculated division ratio. In the example shown in FIG. 11, the division circuit 120 divides the packet #2 into the fragment #2-2 whose size is Y*2/5 byte and the fragment #2-3 whose size is Y*3/5 byte.

Next, the division circuit 120 of the wireless communication apparatus A 100A again adds management information to each fragment (S410), and determines whether the size of the each fragment is smaller than the minimum size or not (S420). When the size of at least one of the fragments #2-2 and #2-3 is smaller than 64 byte (YES at S420), the processing of S422 is performed again.

On the other hand, when the sizes of the fragments #2-2 and #2-3 are equal to or larger than 64 bytes (NO at S420), the wireless communication apparatus A 100A transmits each of the fragments #2-2 and #2-3 through the wireless line having the transmission capacity corresponding to the size of that fragment to the wireless communication apparatus B 100B which is the reception side (S412).

Specifically, as shown by arrows B in FIG. 11, the division circuit 120 transmits the fragment #2-2 whose size corresponds to the ratio of the transmission capacity #2 of the wireless line #2 to the wireless transmission/reception processing circuit 140-2 corresponding to the wireless line #2. The division circuit 120 transmits the fragment #2-3 whose size corresponds to the ratio of the transmission capacity #3 of the wireless line #3 to the wireless transmission/reception processing circuit 140-3 corresponding to the wireless line #3.

The wireless transmission/reception processing circuit 140-2 performs the processing such as the modulation processing and the amplification for the fragment #2-2 and transmits the radio wave to the wireless communication apparatus B 100B which is the reception side through the wireless line #2. The wireless transmission/reception processing circuit 140-3 performs the processing such as the modulation processing and the amplification for the fragment #2-3 and transmits the radio wave to the wireless communication apparatus B 100B which is the reception side through the wireless line #3.

In this case, the division circuit 120 does not transmit any fragment to the wireless transmission/reception processing circuit 140-1 corresponding to the wireless line #1. Therefore, the wireless transmission/reception processing circuit 140-1 does not transmit any fragment to the wireless communication apparatus B 100B which is the reception side.

Assuming the wireless transmission/reception processing circuit 140 receives the fragment whose size is smaller than the minimum size from the division circuit 120, the wireless transmission/reception processing circuit 140 determines that an error has occurred and discards the fragment. Thus, a part of the data constituting the packet is lost, and this might lead to a delay of the transmission time.

On the other hand, in the second exemplary embodiment, the division circuit 120 is configured not to transmit the fragment whose size is smaller than the minimum size, as mentioned above. Therefore, it is possible to prevent a part of the data from being discarded as well as to suppress the occurrence of differences in the transmission delays in the wireless lines.

Figure 12:
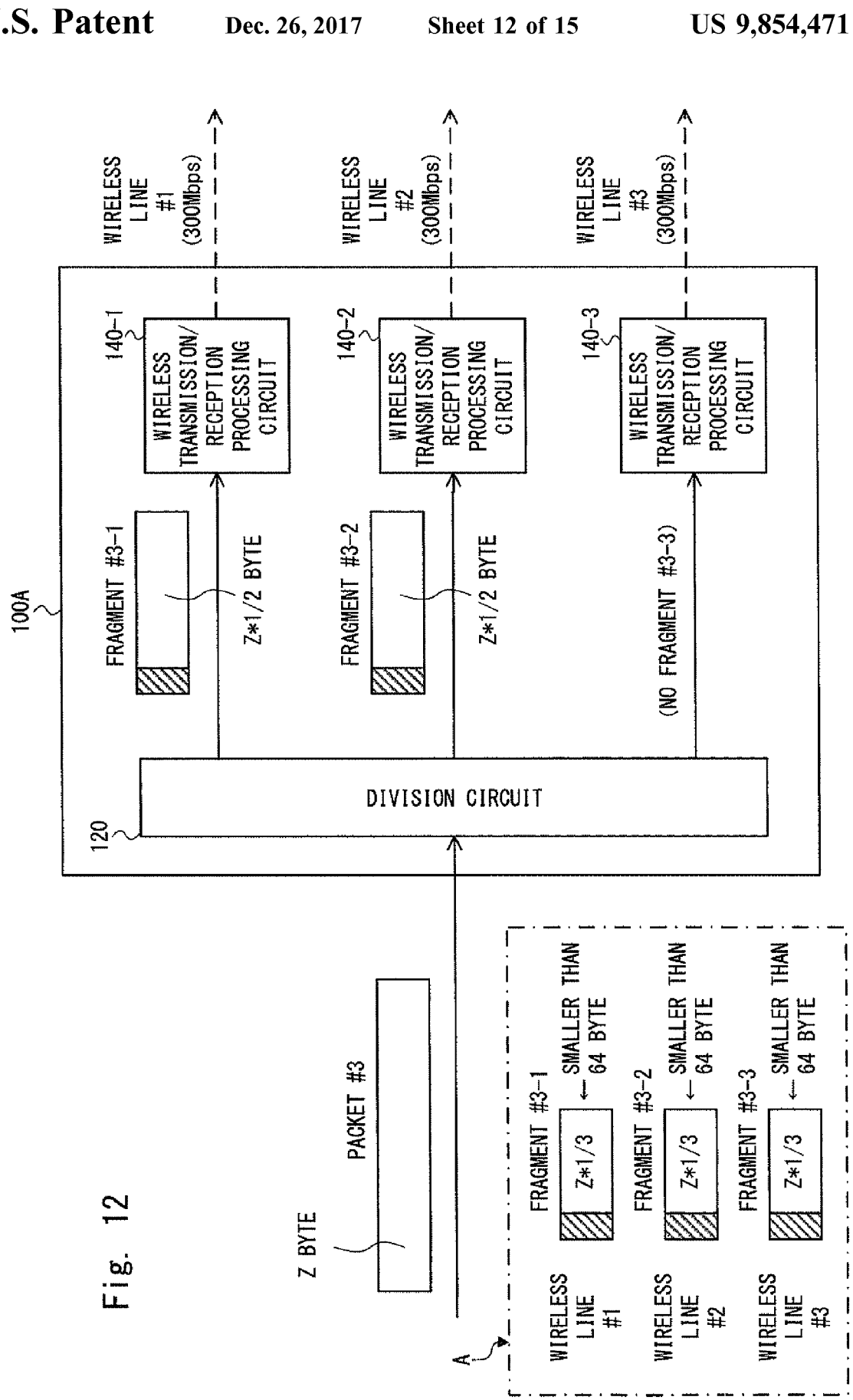
FIG. 12 is an example of flow of data in the wireless communication apparatus being the transmission side according to the second exemplary embodiment.

Note that, as shown in FIG. 12 as an example, the second exemplary embodiment can be applied to a case where the transmission capacities of the wireless lines #1 to #3 are the same as each other. In the example shown in FIG. 12, the transmission capacity of the wireless lines #1 to #3 is 300 Mbps. That is, the ratio among the transmission capacities #1 to #3 of the wireless lines #1 to #3 is equal to "1:1:1". Further, when the division circuit 120 receives a packet #3 whose size is Z [byte], the division circuit 120 firstly divides the packet #3 into fragments #3-1 to #3-3 whose sizes are Z*1/3, as shown by a dashed-dotted line A in FIG. 11.

Then, as shown at the portion surrounded by a dashed-dotted line A in FIG. 11, when the sizes of fragments #3-1 to #3-3 are smaller than the minimum size, i.e., where Z*1/3<64 [byte], the division circuit 120 excludes any wireless line from the wireless lines used for the transmission of the fragments (packet). For example, if the priority of the wireless line #3 is lower than that of other wireless lines, the division circuit 120 may exclude the wireless line #3.

The division circuit 120 may divide the packet #3 into the fragments #3-1 and #3-2 whose sizes are Z*1/2. Further, the wireless transmission/reception processing circuits 140-1 and 140-2 may transmit the fragments #3-1 and #3-2 through the respective wireless lines #1 and #2.

In the above-mentioned second exemplary embodiment, the division circuit 120 re-divides the packet when the size in which the management information is added to the fragment generated by dividing the packet is smaller than the minimum size, as shown at S408 to S422 in FIG. 10. However, the division circuit 120 may not actually divide the packet when the division circuit 120 compares the size of the fragment with the minimum size. That is, the division circuit 120 may only calculate the size of the fragment based on the ratio among the transmission capacities and compare the sum of the size of the fragment and the size of the management information with the minimum size. In this case, only when the sizes (including the size of the management information) of all of the fragments are equal to or larger than the minimum size, the division circuit 120 may divide the packet into the fragments in the sizes.

(Third Exemplary Embodiment)

Next, third exemplary embodiment is explained. In the third exemplary embodiment, the wireless line in which a communication failure has occurred is not used for the transmission of the packet (fragments), in addition to the configuration and the operation according to the first exemplary embodiment.

Note that the configurations of the wireless communication system 50 and the wireless communication apparatus 100 according to the third exemplary embodiment are substantially similar to the configurations shown in FIGS. 2 to 4. Thus, the explanation of the former configurations may be omitted. Further, the operation of the wireless communication apparatus B 100B which is the reception side is substantially similar to the processing operation shown in FIG. 8 of the first exemplary embodiment. Thus, the explanation of the operation may be omitted.

Figure 13:
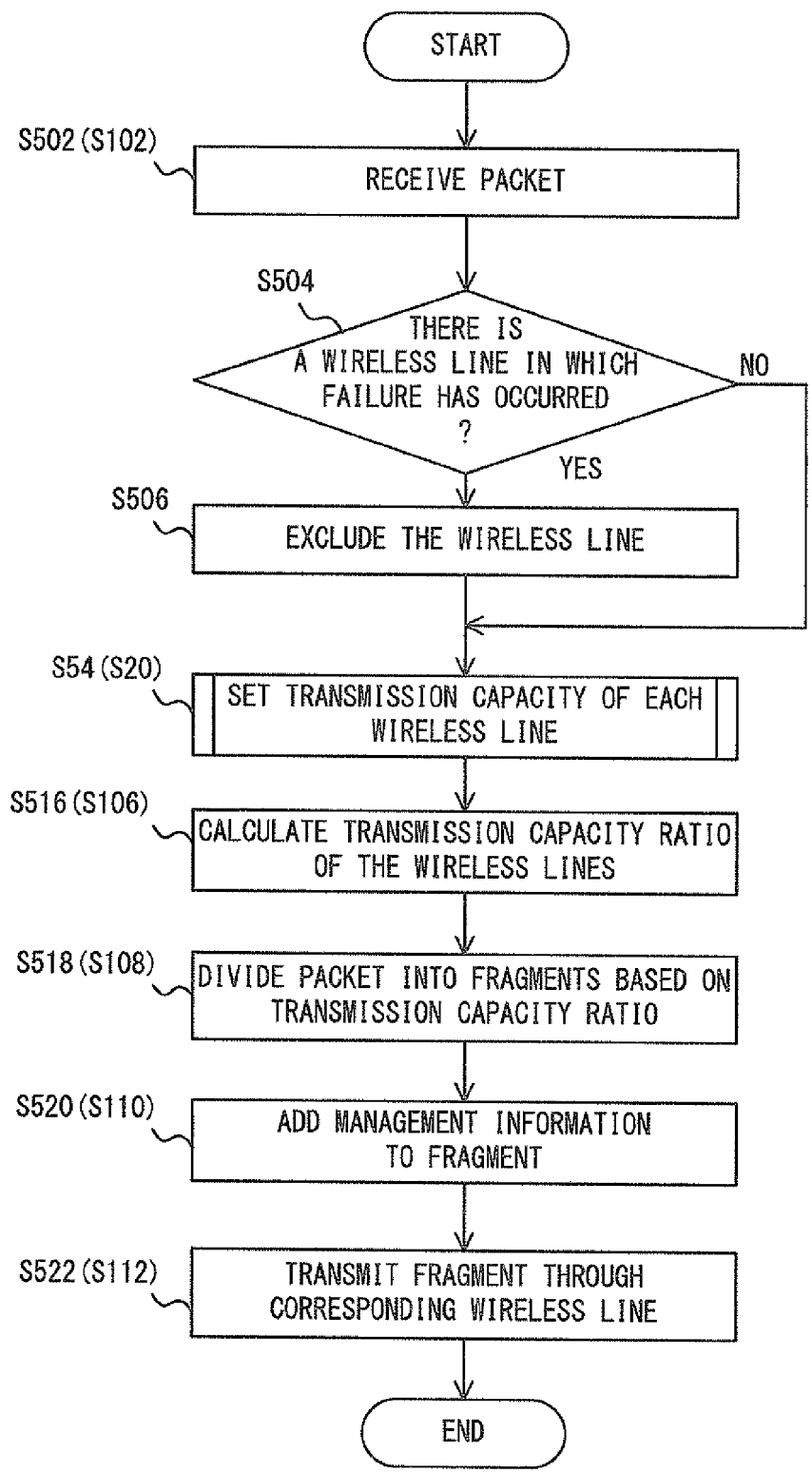
FIG. 13 is a flowchart indicating the operation in the wireless communication apparatus being the transmission side according to the third exemplary embodiment.
Figure 14:
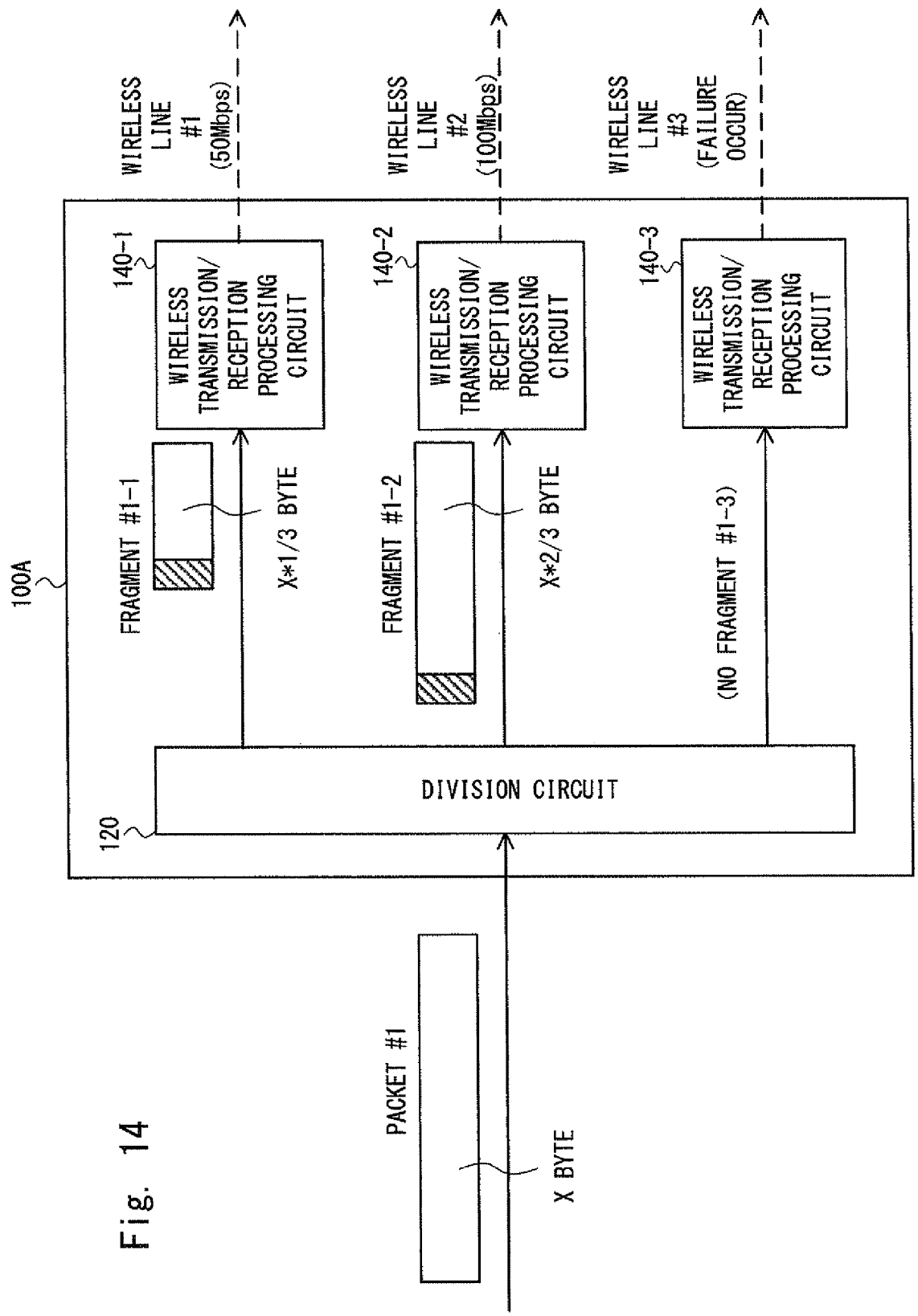
FIG. 14 is an example of flow of data in the wireless communication apparatus being the transmission side according to the third exemplary embodiment.

FIG. 13 is a flowchart indicating the operation in the wireless communication apparatus A 100A which is the transmission side according to the third exemplary embodiment. FIG. 14 is an example of a flow of data in the wireless communication apparatus 100 which is the transmission side (the wireless communication apparatus A 100A). Note that at least one component of the wireless communication apparatus 100 is omitted as appropriate in FIG. 14.

The wireless communication apparatus A 100A receives the packet through the data line 60 (S502), as in the case of the processing of S102 in FIG. 5. Specifically, the division circuit 120 receives a packet #1 as shown in FIG. 14.

Next, the control unit 200 of the wireless communication apparatus A 100A determines whether there is a wireless line in which a communication failure has occurred or not (S504). When there is a wireless line in which a communication failure has occurred (YES at S504), the control unit 200 excludes the wireless line from the wireless lines used for the transmission (S506). On the other hand, when there is no wireless line in which a communication failure has occurred (NO at S504), the control unit 200 skips the processing of S56 and performs the processing of S54 as mentioned below.

Specifically, the wireless transmission/reception processing circuits 140-1 to 140-3 detect an occurrence of a communication failure when a communication failure has occurred in the wireless lines #1 to #3, respectively. Further, when the wireless transmission/reception processing circuits 140-1 to 140-3 detect the occurrence of a communication failure in the wireless lines #1 to #3, the wireless transmission/reception processing circuits 140-1 to 140-3 transmit a notification indicating the occurrence (failure-occurrence notification) to the control unit 200.

When the control unit 200 receives the failure-occurrence notification from the wireless transmission/reception processing circuit 140, the control unit 200 determines that a communication failure has occurred in the wireless line corresponding to the wireless transmission/reception processing circuit 140 which has transmitted the failure-occurrence notification. In this case, the control unit 200 excludes the wireless line corresponding to the wireless transmission/reception processing circuit 140 which has transmitted the failure-occurrence notification from the wireless lines used for the transmission. The control unit 200 then performs subsequent processing.

For example, in the example shown in FIG. 14, a communication failure has occurred in the wireless line #3. Therefore, the wireless transmission/reception processing circuit 140-3 transmits a failure-occurrence notification to the control unit 200. When the control unit 200 receives the failure-occurrence notification from the wireless transmission/reception processing circuit 140-3, the control unit 200 excludes the wireless line #3 corresponding to the wireless transmission/reception processing circuit 140-3.

Hereinafter, the case where a communication failure has occurred in a certain wireless line (wireless line #3) (YES at S504) is explained. Note that the processing is substantially similar to the processing according to the first exemplary embodiment when a communication failure has not occurred in any of the wireless lines (NO at S504).

Next, the control unit 200 of the wireless communication apparatus A 100A sets the transmission capacity of each of the wireless lines (S54), as in the case of the processing of S20 in FIG. 5. Note that the control unit 200 sets the transmission capacity for the wireless lines other than the wireless line in which a communication failure has occurred. In the example shown in FIG. 14, the control unit 200 sets the transmission capacities #1 and #2 for the wireless lines #1 and #2, which are the wireless lines other than the wireless line #3. Note that the processing of S54 is substantially similar to the processing of S20 in FIG. 5. Thus, the explanation of the former processing may be omitted.

Next, the division circuit 120 of the wireless communication apparatus A 100A calculates the ratio among the transmission capacities of the wireless lines (S516), as in the case of the processing of S106 in FIG. 5. Note that the wireless line #3 is excluded. Thus, the division circuit 120 calculates the ratio between the transmission capacities of the wireless lines #1 and #2. Specifically, the division circuit 120 calculates a ratio "(transmission capacity #1):(transmission capacity #2)" as the ratio between the transmission capacities based on the transmission capacities #1 and #2 of the respective wireless lines #1 and #2 which are received from the control unit 200.

Moreover, the division circuit 120 calculates a ratio "(transmission capacity #1)/((transmission capacity #1)+(transmission capacity #2))" as the ratio (rate) of the transmission capacity of the wireless line #1. In a similar way, the division circuit 120 calculates a ratio "(transmission capacity #2)/((transmission capacity #1)+(transmission capacity #2))" as the ratio (rate) of the transmission capacity of the wireless line #2.

In the example shown in FIG. 14, the transmission capacity #1 of the wireless line #1 is 50 Mbps and the transmission capacity #2 of the wireless line #2 is 100 Mbps. Therefore, the division circuit 120 calculates the ratio between the transmission capacities #1 and #2 of the wireless lines #1 and #2 as "50:100=1:2". Further, in this case, the division circuit 120 calculates the ratio of the transmission capacity of the wireless line #1 as 1/3, and the ratio of the transmission capacity of the wireless line #2 as 2/3.

Next, the division circuit 120 of the wireless communication apparatus A 100A divides the packet into the fragments based on the calculated ratio among the transmission capacities (S518), as in the case of the processing of S108 in FIG. 5. If the size of a packet #2 is X byte, the division circuit 120 calculates the size of a fragment #1-1 corresponding to the wireless line #1 by an expression "X* (transmission capacity #1)/((transmission capacity #1)+ (transmission capacity #2)) [byte]". In a similar way, the division circuit 120 calculates the size of a fragment #1-2 corresponding to the wireless line #2 by an expression "X*(transmission capacity #2)/((transmission capacity #1)+ (transmission capacity #2)) [byte]".

Moreover, the division circuit 120 divides the packet into the fragments based on the calculated division ratio. In the example shown in FIG. 14, if the size of the packet #1 is X byte, the division circuit 120 divides the packet #1 into the fragment #1-1 whose size is Y*1/3 byte and the fragment #1-2 whose size is Y*2/3 byte. That is, the size of the fragment #1-1 corresponds to the amount (ratio) of the transmission capacity of the wireless line #1 for the wireless lines #1 and #2. The size of the fragment #1-2 corresponds to the amount (ratio) of the transmission capacity of the wireless line #2 for the wireless lines #1 and #2.

Next, the division circuit 120 of the wireless communication apparatus A 100A adds management information to each fragment (S520), as in the case of the processing of S110 in FIG. 5.

Next, the wireless communication apparatus A 100A transmits each fragment through the wireless line having the transmission capacity corresponding to the size of that fragment (S522) to the wireless communication apparatus B 100B which is the reception side, as in the case of the processing of S112 in FIG. 5.

In the example shown in FIG. 14, the division circuit 120 transmits the fragment #1-1 whose size corresponds to the ratio of the transmission capacity #1 of the wireless line #1 to the wireless transmission/reception processing circuit 140-1 corresponding to the wireless line #1. The division circuit 120 transmits the fragment #1-2 whose size corresponds to the ratio of the transmission capacity #2 of the wireless line #2 to the wireless transmission/reception processing circuit 140-2 corresponding to the wireless line #2.

The wireless transmission/reception processing circuit 140-1 performs the processing such as the modulation processing and the amplification for the fragment #1-1 and transmits the radio wave to the wireless communication apparatus B 100B which is the reception side through the wireless line #1. The wireless transmission/reception processing circuit 140-2 performs the processing such as the modulation processing and the amplification for the fragment #1-2 and transmits the radio wave to the wireless communication apparatus B 100B which is the reception side through the wireless line #2. In this case, the division circuit 120 does not transmit any fragment to the wireless transmission/reception processing circuit 140-3 corresponding to the wireless line #3. Therefore, the wireless transmission/reception processing circuit 140-3 does not transmit any fragment to the wireless communication apparatus B 100B which is the reception side.

If it is intended that the data is to be transmitted through the wireless line in which a communication failure has occurred, there is a possibility that a large transmission delay may occur only in that wireless line. On the other hand, in the third exemplary embodiment, the wireless communication apparatus 100 excludes the wireless line in which a communication failure has occurred and transmits the data using the wireless lines other than the excluded wireless line. Therefore, it is possible to further suppress the occurrence of differences in transmission delays in the wireless lines.

Note that, the system according to the third exemplary embodiment can immediately respond to the case where the wireless line in which a communication failure has occurred recovers from the failure and returns to a normal communication state.

A case will be explained where the wireless communication apparatus A 100A receives the packet #1 for the example shown in FIG. 14, transmits the fragments #1-1 and #1-2 and then receives the packet #2 and the failure which has occurred in the wireless line #3 is reversed.

Figure 15:
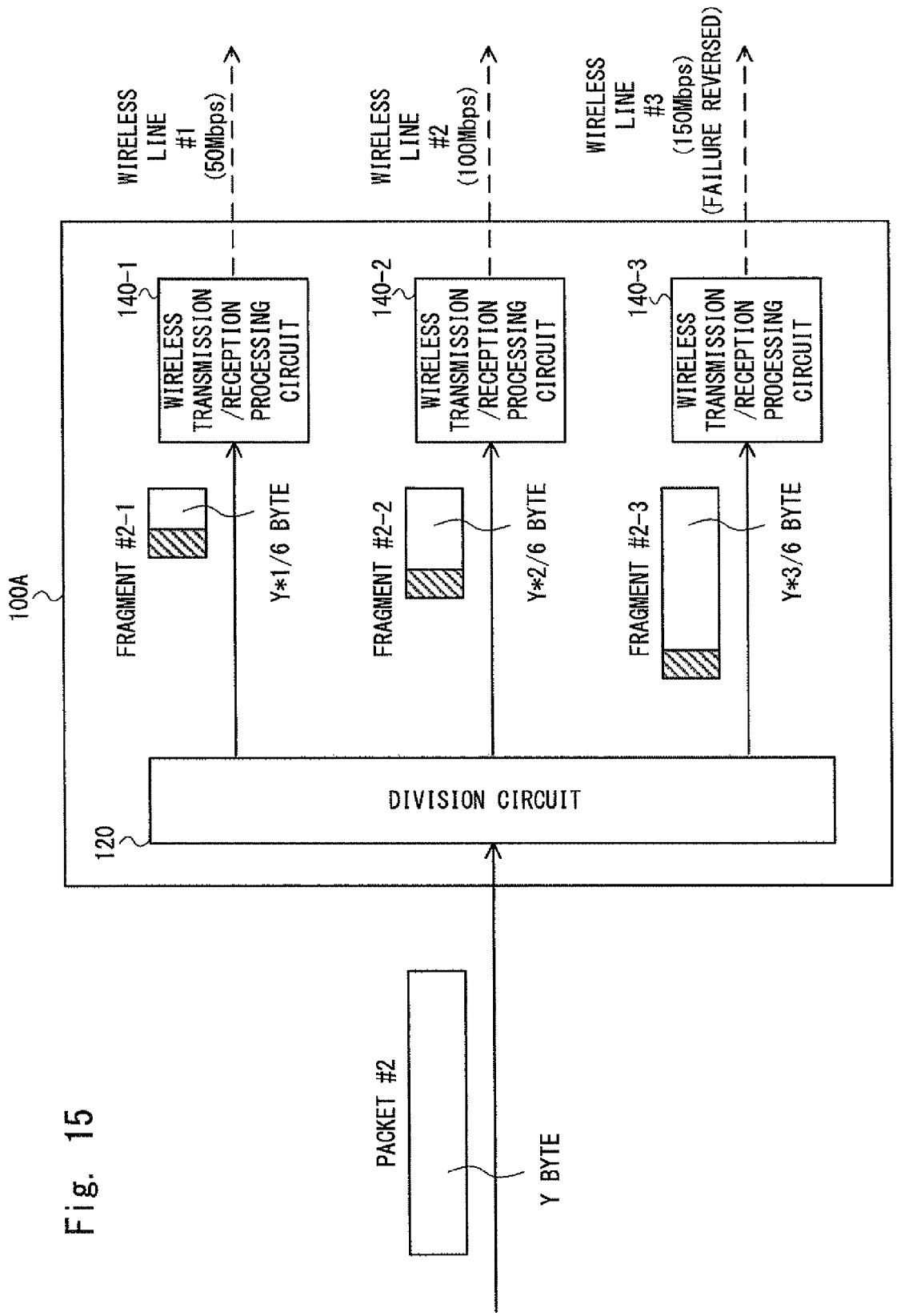
FIG. 15 is an example of flow of data in the wireless communication apparatus being the transmission side according to the third exemplary embodiment.

In the example shown in FIG. 15, when the division circuit 120 receives the packet #2, the failure which has occurred in the wireless line #3 is reversed (NO at S504). Therefore, the processing of S506 shown in FIG. 13 is not performed and instead processing substantially similar to that of the first exemplary embodiment is performed. Therefore, the division circuit 120 calculates the ratio among the transmission capacities #1 to #3 of the wireless lines #1 to #3 as "1:2:3". Moreover, if the size of a packet #2 is Y byte, the division circuit 120 divides the packet #2 into the fragment #2-1 whose size is Y*1/6 byte, the fragment #2-2 whose size is Y*2/6 byte and the fragment #2-3 whose size is Y*3/6 byte.

Note that the configuration and the operation according to the third second exemplary embodiment can be applied to the second exemplary embodiment. In other words, the processing of S504 and S506 shown in FIG. 13 may be configured to be performed between S402 and S44 shown in FIG. 10 according to the second exemplary embodiment.

(Modified Examples)

Note that the present invention is not limited to the above-described exemplary embodiments, and they can be modified as desired without departing from the spirit and scope of the present invention.

In the above-mentioned exemplary embodiments, the number of the multiple wireless lines is three (wireless lines #1 to #3). However, the number of the wireless lines may be any number more than one.

Further, in the above-described flowcharts, the order of the processes (steps) can be changed as appropriate. Further, at least one of the multiple processes (steps) may be omitted. For example, the process of S102 shown in FIG. 5 may be performed after the process of S20 or S106. This is also applicable to the processes shown in FIGS. 10 and 13.

Further, the wireless communication apparatus A 100A and the wireless communication apparatus B 100B may include only one of the division circuit 120 and the reconstruction circuit 160. That is, for example, if the data is transmitted from the wireless communication apparatus A 100A to the wireless communication apparatus B 100B but the data is not transmitted from the wireless communication apparatus B 100B to the wireless communication apparatus A 100A, the wireless communication apparatus A 100A may include the division circuit 120 but may not include the reconstruction circuit 160. In this case, the wireless communication apparatus B 100B may include the reconstruction circuit 160 but may not include the division circuit 120.

Further, in the above-mentioned exemplary embodiments, the control unit 200 stores the modulation scheme correspondence table, refers to this and converts the modulation scheme information to the transmission capacity. However, the method for setting the transmission capacity of the wireless line is not limited to this. For example, the control unit 200 may receive, from the wireless transmission/reception processing circuit 140, information indicating bandwidth (transmission capacity) of the corresponding wireless line. In this case, the control unit 200 may not store the modulation scheme information.

Further, a ratio among sizes of the fragments to which the management information has not been added yet may be the ratio among the transmission capacities of the wireless lines, or a ratio among sizes of the fragments to which the management information has already been added may be the ratio among the transmission capacities of the wireless lines. In the former case, the processing becomes simple because it is only necessary to divide the packet into the fragments for the ratio among the transmission capacities of the wireless lines. In the latter case, the ratio among the transmission capacities of the wireless lines can conform closely to the ratio among the sizes of fragments (including the management information) which are actually transmitted. Therefore, it is possible to further suppress differences in transmission delays in wireless lines.

Further, in the above-mentioned exemplary embodiments, the packet is divided into fragments for the ratio among the transmission capacities of the wireless lines. However, the division ratio need not confirm closely to the ratio among the transmission capacities of the wireless lines. For example, a weighting value (coefficient) may be weighted depending on the priority of the wireless line, radio wave condition or the like. For example, in the example shown in FIG. 7, if the priority of the wireless line #1 is high, the size of the fragment #1-1 may be X*1/6*k (where k is a coefficient which is larger than 1) and the sizes of the fragments #1-2 and #1-3 may be coordinated in accordance with the size of the fragment #1-1, as appropriate.

Further, the ratio among the sizes of the fragments need not strictly correspond to the ratio among the transmission capacities. For example, it is assumed that a fragment which is transmitted through the wireless line #1 whose transmission capacity is transmission capacity #1 is a fragment #1, a fragment which is transmitted through the wireless line #2 whose transmission capacity is transmission capacity #2 is a fragment #2, and a fragment which is transmitted through the wireless line #3 whose transmission capacity is transmission capacity #3 is a fragment #3. In this case, when (transmission capacity #1)<(transmission capacity #2)<(transmission capacity #3), the only condition which has to be met is that (size of fragment #1)<(size of fragment #2)<(size of fragment #3).

Further, in the above-mentioned exemplary embodiments, the present invention has been explained as a hardware configuration, however the present invention is not limited thereto. In the present invention, the processing of each of the circuits in the wireless communication apparatus can be realized by causing a CPU (Central Processing Unit) to execute a computer program.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been explained with reference to the exemplary embodiments, the present invention is not limited by above. Various modifications, obvious to those in the art, can be made to the configurations and details of the present invention within the scope of the invention.

The present application claims priority rights of and is based on Japanese Patent Application No. 2013-091273 filed on Apr. 24, 2013 in the Japanese Patent Office, the entire contents of which are hereby incorporated by reference.

REFERENCE SIGNS LIST

1 WIRELESS COMMUNICATION APPARATUS
12 DIVISION MEANS
14 TRANSMISSION MEANS
50 WIRELESS COMMUNICATION SYSTEM
60 DATA LINE
100 WIRELESS COMMUNICATION APPARATUS
120 DIVISION CIRCUIT
140 WIRELESS TRANSMISSION/RECEPTION PROCESSING CIRCUIT
160 RECONSTRUCTION CIRCUIT
200 CONTROL UNIT

The invention claimed is:

1. A wireless communication apparatus comprising:
a transmission unit that transmits radio waves to another wireless communication apparatus through a plurality of wireless lines; and
a division unit, comprising one or more controllers, that divides data into data pieces having sizes each of which correspond to the transmission capacity of a respective one of the plurality of the wireless lines and generates a first plurality of fragments,
wherein the transmission unit transmits each of the first plurality of fragments to the another wireless communication apparatus respectively through the wireless line having the transmission capacity corresponding to the size of the fragment,
wherein the first plurality of fragments are transmitted in parallel through the plurality of wireless lines, and
wherein when a failure has occurred in at least one of the plurality of wireless lines, the transmission unit detects the wireless line in which the failure has occurred, wherein:
the division unit divides the data into data pieces having sizes each of which correspond to the transmission capacity of each of one or more of the wireless lines among the plurality of wireless lines other than the wireless line in which the failure has occurred, and generates a second plurality of fragments; and
the transmission unit transmits the second plurality of fragments through the one or more of the wireless lines among the plurality of the wireless lines other than the wireless line in which the failure has occurred.

2. The wireless communication apparatus according to claim 1, wherein the division unit determines the size of each of the first plurality of fragments based on a ratio of the transmission capacity of each of the plurality of the wireless lines.

3. The wireless communication apparatus according to claim 2, wherein:
the division unit divides the data based on a division ratio corresponding to a ratio among the transmission capacities of the plurality of the wireless lines and generates the first plurality of fragments; and
the transmission unit transmits a first fragment whose size corresponds to the ratio of the transmission capacity of a first wireless line among the plurality of the wireless lines through the first wireless line.

4. The wireless communication apparatus according to claim 1, wherein:
when the size of a second fragment among the first plurality of fragments is smaller than a predetermined minimum size, the division unit divides the data into data pieces having sizes each of which correspond to the transmission capacity of each of one or more of the wireless lines other than a second wireless line having the transmission capacity corresponding to the size of the second fragment and generates a third plurality of fragments; and
the transmission unit transmits the third plurality of fragments through one or more of the wireless lines among the plurality of the wireless lines other than the second wireless line.

5. The wireless communication apparatus according to claim 1, wherein:
the division unit adds management information for reconstructing the data in the other wireless communication apparatus to each of the first plurality of fragments; and
the transmission unit transmits each of the first plurality of fragments to which the management information has been added through each of the plurality of the wireless lines.

6. The wireless communication apparatus according to claim 1, wherein:
the transmission unit modifies a modulation scheme per the plurality of the wireless lines, modulates the data with the modified modulation scheme and transmits the data through the plurality of the wireless lines; and
the division unit divides the data into data pieces having sizes each of which correspond to the transmission capacity which is changed with the modification of the modulation scheme and generates the first plurality of fragments.

7. A wireless communication method for a wireless communication apparatus, the method comprising:
dividing data into data pieces having sizes each of which correspond to the transmission capacity of a respective one of a plurality of wireless lines and generating a first plurality of fragments; and
transmitting each of the first plurality of fragments to another wireless communication apparatus respectively through the wireless line having the transmission capacity corresponding to the size of the fragment,
wherein the first plurality of fragments are transmitted in parallel through the plurality of wireless lines,
wherein when a failure has occurred in at least one of the plurality of wireless lines:
detecting the wireless line in which the failure has occurred;
dividing the data into data pieces having sizes each of which correspond to the transmission capacity of each of one or more of the wireless lines among the plurality of wireless lines other than the wireless line in which the failure has occurred, and generating a second plurality of fragments; and
transmitting the second plurality of fragments through the one or more of the wireless lines among the plurality of the wireless lines other than the wireless line in which the failure has occurred.

8. A wireless communication apparatus, comprising:
memory storing instructions; and
one or more processors configured to execute the instructions to:
divide data into data pieces having sizes each of which correspond to the transmission capacity of a respective one of a plurality of wireless lines and generating a first plurality of fragments; and
transmit each of the first plurality of fragments to another wireless communication apparatus respectively through the wireless line having the transmission capacity corresponding to the size of the fragment,
wherein the first plurality of fragments are transmitted in parallel through the plurality of wireless lines,
wherein when a failure has occurred in at least one of the plurality of wireless lines, the one or more processors are further configured to execute the instructions to:
detect the wireless line in which the failure has occurred;
divide the data into data pieces having sizes each of which correspond to the transmission capacity of each of one or more of the wireless lines among the plurality of wireless lines other than the wireless line in which the failure has occurred, and generate a second plurality of fragments; and
transmit the second plurality of fragments through the one or more of the wireless lines among the plurality of the wireless lines other than the wireless line in which the failure has occurred.

* * * * *